US012551506B2

(12) United States Patent
Koppes et al.

(10) Patent No.: US 12,551,506 B2
(45) Date of Patent: Feb. 17, 2026

(54) DIFFERENTIATION OF OLFACTORY MUCOSA DERIVED MESENCHYMAL STEM CELLS TO SCHWANN CELLS FOR PERIPHERAL NERVE REPAIR

(71) Applicant: Northeastern University, Boston, MA (US)

(72) Inventors: Ryan A. Koppes, Charlestown, MA (US); Katelyn E. Neuman, Boston, MA (US); Abigail N. Koppes, Charlestown, MA (US); Aidan Kenny, Boston, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 0 days.

(21) Appl. No.: 17/728,956

(22) Filed: Apr. 25, 2022

(65) Prior Publication Data
US 2022/0339200 A1    Oct. 27, 2022

Related U.S. Application Data

(60) Provisional application No. 63/178,527, filed on Apr. 23, 2021.

(51) Int. Cl.
*A61K 35/30* (2015.01)
*A61P 25/00* (2006.01)
*C12N 5/079* (2010.01)

(52) U.S. Cl.
CPC .............. *A61K 35/30* (2013.01); *A61P 25/00* (2018.01); *C12N 5/0622* (2013.01); *C12N 2500/32* (2013.01); *C12N 2500/44* (2013.01); *C12N 2501/13* (2013.01); *C12N 2506/1392* (2013.01)

(58) Field of Classification Search
None
See application file for complete search history.

(56) References Cited

U.S. PATENT DOCUMENTS 11,406,737 B2    8/2022    Soucy et al.

OTHER PUBLICATIONS

Li et al Current Neuropharmacology, 2022, vol. 20, No. 2 (Year: 2022).*
Neuman, Katelyn, Abigail N. Koppes, and Ryan A. Koppes. "Olfactory Mucosa-Derived Mesenchymal Stem Cells Differentiate Towards a Schwann Cell-Like Phenotype Towards Sourcing for Peripheral Nerve Regeneration." bioRxiv (2024): Sep. 2024. (Year: 2024).*
Alvites, R. D., Santos, A. R. C., Varejão, A. S. P., & Maurício, A. (2017). Olfactory mucosa mesenchymal stem cells and biomaterials: A new combination to regenerative therapies after peripheral nerve injury. *Mesenchymal Stem Cells-Isolation, Characterization and Applications.*
Bernal, A., & Arranz, L. (2018). Nestin-expressing progenitor cells: function, identity and therapeutic implications. *Cellular and Molecular Life Sciences*, 75(12), 2177-2195.
Clements, M. P., Byrne, E., Guerrero, L. F. C., Cattin, A. L., Zakka, L., Ashraf, A., . . . & Parrinello, S. (2017). The wound microenvironment reprograms Schwann cells to invasive mesenchymal-like cells to drive peripheral nerve regeneration. *Neuron*, 96(1), 98-114.
Georgiou, M., Golding, J. P., Loughlin, A. J., Kingham, P. J., & Phillips, J. B. (2015). Engineered neural tissue with aligned, differentiated adipose-derived stem cells promotes peripheral nerve regeneration across a critical sized defect in rat sciatic nerve. *Biomaterials*, 37, 242-251.
Ghasemi-Mobarakeh, L., Prabhakaran, M. P., Morshed, M., Nasr-Esfahani, M. H., & Ramakrishna, S. (2009). Electrical stimulation of nerve cells using conductive nanofibrous scaffolds for nerve tissue engineering. *Tissue Engineering Part A*, 15(11), 3605-3619.
Girard, S. D., Devéze, A., Nivet, E., Gepner, B., Roman, F. S., & Féron, F. (2011). Isolating nasal olfactory stem cells from rodents or humans. *JoVE (Journal of Visualized Experiments)*, (54), e2762.
Gomez-Sanchez, J. A., Pilch, K. S., van der Lans, M., Fazal, S. V., Benito, C., Wagstaff, L. J., . . . & Jessen, K. R. (2017). After nerve injury, lineage tracing shows that myelin and Remak Schwann cells elongate extensively and branch to form repair Schwann cells, which shorten radically on remyelination. *Journal of Neuroscience*, 37(37), 9086-9099.
Hardy, J. G., Cornelison, R. C., Sukhavasi, R. C., Saballos, R. J., Vu, P., Kaplan, D. L., & Schmidt, C. E. (2015). Electroactive tissue scaffolds with aligned pores as instructive platforms for biomimetic tissue engineering. *Bioengineering*, 2(1), 15-34.
Hu, F., Zhang, X., Liu, H., Xu, P., Teng, G., & Xiao, Z. (2017). Neuronally differentiated adipose-derived stem cells and aligned PHBV nanofiber nerve scaffolds promote sciatic nerve regeneration. *Biochemical and Biophysical Research Communications*, 489(2), 171-178.
Kolar, M. K., Itte, V. N., Kingham, P. J., Novikov, L. N., Wiberg, M., & Kelk, P. (2017). The neurotrophic effects of different human dental mesenchymal stem cells. *Scientific reports*, 7(1), 1-12.
Koppes, A. N., Nordberg, A. L., Paolillo, G. M., Goodsell, N. M., Darwish, H. A., Zhang, L., & Thompson, D. M. (2014). Electrical stimulation of Schwann cells promotes sustained increases in neurite outgrowth. *Tissue Engineering Part A*, 20(3-4), 494-506.
Lo Furno, D., Mannino, G., Giuffrida, R., Gili, E., Vancheri, C., Tarico, M. S., . . . & Pellitteri, R. (2018). Neural differentiation of human adipose-derived mesenchymal stem cells induced by glial cell conditioned media. *Journal of Cellular Physiology*, 233(10), 7091-7100.

(Continued)

*Primary Examiner* — Kara D Johnson
*Assistant Examiner* — Constantina E Stavrou
(74) *Attorney, Agent, or Firm* — HAMILTON, BROOK, SMITH & REYNOLDS, P.C.

(57) ABSTRACT

Provided herein are, in various embodiments, methods and compositions for differentiating olfactory mucosa-derived mesenchymal stem cells (OM-MSC). In certain embodiments, the disclosure provides for media to differentiate OM-MSCs. In still further embodiments, the disclosure provides for methods and compositions using differentiated OM-MSCs for the treatment of nerve repair. In particular embodiments, the disclosure provides for novel treatments of peripheral nerve repair.

10 Claims, 16 Drawing Sheets

(56) References Cited

OTHER PUBLICATIONS

Mathot, F., Rbia, N., Thaler, R., Bishop, A. T., Van Wijnen, A. J., & Shin, A. Y. (2020). Gene expression profiles of differentiated and undifferentiated adipose derived mesenchymal stem cells dynamically seeded onto a processed nerve allograft. *Gene*, 724, 144151.
Morrissey, T. K., Kleitman, N., & Bunge, R. P. (1991). Isolation and functional characterization of Schwann cells derived from adult peripheral nerve. *Journal of Neuroscience*, 11(8), 2433-2442.
Neuman, K. E., Kenny, A., Shi, L., Koppes, A., & Koppes, R. (2022). Complex Material Properties of Gel-Amin: A Transparent and Ionically Conductive Hydrogel for Neural Tissue Engineering. *Cells Tissues Organs*.
Piovesana, R., Faroni, A., Tata, A. M., & Reid, A. J. (2021). Schwann-like adipose-derived stem cells as a promising therapeutic tool for peripheral nerve regeneration: effects of cholinergic stimulation. *Neural Regeneration Research*, 16(6), 1218.
Puzan, M. L., Legesse, B., Koppes, R. A., Fenniri, H., & Koppes, A. N. (2018). Bioactive Organic Rosette Nanotubes Support Sensory Neurite Outgrowth. *ACS Biomaterials Science & Engineering*, 4(5), 1630-1640.
Razavi, S., Ahmadi, N., Kazemi, M., Mardani, M., & Esfandiari, E. (2012). Efficient transdifferentiation of human adipose-derived stem cells into Schwann-like cells: a promise for treatment of demyelinating diseases. *Advanced biomedical research*, 1.
Roche, P., Alekseeva, T., Widaa, A., Ryan, A., Matsiko, A., Walsh, M., . . . & O'Brien, F. J. (2017). Olfactory derived stem cells delivered in a biphasic conduit promote peripheral nerve repair in vivo. *Stem cells translational medicine*, 6(10), 1894-1904.
Saheb-Al-Zamani, M., Yan, Y., Farber, S. J., Hunter, D. A., Newton, P., Wood, M. D., . . . & Mackinnon, S. E. (2013). Limited regeneration in long acellular nerve allografts is associated with increased Schwann cell senescence. *Experimental neurology*, 247, 165-177.
Schmidt, C. E., Shastri, V. R., Vacanti, J. P., & Langer, R. (1997). Stimulation of neurite outgrowth using an electrically conducting polymer. *Proceedings of the National Academy of Sciences*, 94(17), 8948-8953.
Seggio, A. M., Ellison, K. S., Hynd, M. R., Shain, W., & Thompson, D. M. (2008). Cryopreservation of transfected primary dorsal root ganglia neurons. *Journal of Neuroscience Methods*, 173(1), 67-73.
Syu, W. Z., Hueng, D. Y., Chen, W. L., Chan, J. Y. H., Chen, S. G., & Huang, S. M. (2019). Adipose-derived neural stem cells combined with acellular dermal matrix as a neural conduit enhances peripheral nerve repair. *Cell transplantation*, 28(9-10), 1220-1230.
Wong, C. W., Xu, Y., Liu, X., Xu, S., Zhang, Y., Zhu, Z., & He, B. (2020). Effect of induction time on the proliferation and differentiation of induced Schwann-like cells from adipose-derived stem cells. *Cellular and Molecular Neurobiology*, 40(7), 1105-1116.
Xu, H., Holzwarth, J. M., Yan, Y., Xu, P., Zheng, H., Yin, Y., . . . Ma, P. X. (2014). Conductive PPY/PDLLA conduit for peripheral nerve regeneration. *Biomaterials*, 35(1), 225-235.
Xue, J., Yang, J., O'Connor, D. M., Zhu, C., Huo, D., Boulis, N. M., & Xia, Y. (2017). Differentiation of bone marrow stem cells into schwann cells for the promotion of neurite outgrowth on electrospun fibers. *ACS applied materials & interfaces*, 9(14), 12299-12310.
Barton MJ, John JS, Clarke M, Wright A, Ekberg J., The Glia Response after Peripheral Nerve Injury: A Comparison between Schwann Cells and Olfactory Ensheathing Cells and Their Uses for Neural Regenerative Therapies, Jan. 29, 2017, Int J Mol Sci. doi: 10.3390/ijms18020287. PMID: 28146061; PMCID: PMC5343823, 1-19, 18(2).
Bianco, J. I., et al., "Neurotrophin 3 promotes purification and proliferation of olfactory ensheathing cells from human nose", GLIA, vol. 45, 2004, pp. 111-123.
Chen ZX, Lu HB, Jin XL, Feng WF, Yang XN, Qi ZL, Skeletal muscle-derived cells repair peripheral nerve defects in mice, Jan. 1, 2020, Neural Regen Res. doi: 10.4103/1673-5374.264462. PMID: 31535664; PMCID: PMC6862419, 152-161, 15(1).
Fernandes M, Valente SG, Sabongi RG, Gomes Dos Santos JB, Leite VM, Ulrich H, Nery AA, da Silva Fernandes MJ, Bone marrow-derived mesenchymal stem cells versus adipose-derived mesenchymal stem cells for peripheral nerve regeneration, Jan. 1, 2018, Neural Regen Res. doi: 10.4103/1673-5374.224378. PMID: 29451213; PMCID: PMC5840974, 100-104, 13(1).
Franklin RJ, Gilson JM, Franceschini IA, Barnett SC, Schwann cell-like myelination following transplantation of an olfactory bulb-ensheathing cell line into areas of demyelination in the adult CNS, Jul. 1, 1996, Glia, doi: 10.1002/(SICI)1098-1136(199607)17:3<217::AID-GLIA4>3.0.CO;2-Y. PMID: 8840163, 217-24, 17(3).
Gänger S, Schindowski K., Tailoring Formulations for Intranasal Nose-to-Brain Delivery: A Review on Architecture, Physico-Chemical Characteristics and Mucociliary Clearance of the Nasal Olfactory Mucosa, Aug. 3, 2018, Pharmaceutics, doi: 10.3390/pharmaceutics10030116. PMID: 30081536; PMCID: PMC6161189, 1-28, 10(3).
Han GH, Peng J, Liu P, Ding X, Wei S, Lu S, Wang Y., Therapeutic strategies for peripheral nerve injury: decellularized nerve conduits and Schwann cell transplantation, Aug. 1, 2019, Neural Regen Res., doi: 10.4103/1673-5374.253511. PMID: 30964052; PMCID: PMC6524503, 1343-1351, 14(8).
Hei, W.H., et al., "Schwann-like cells differentiated from human dental pulp stem cells combined with a pulsed electromagnetic field can improve peripheral nerve regeneration", Bioelectromagnetics, vol. 37, 2016, pp. 163-174.
Kaka G, Arum J, Sadraie SH, Emamgholi A, Mohammadi A., Bone Marrow Stromal Cells Associated with Poly L-Lactic-Co-Glycolic Acid (PLGA) Nanofiber Scaffold Improve Transected Sciatic Nerve Regeneration, Sep. 27, 2017, Iran J Biotechnol. doi: 10.15171/ijb.1576. PMID: 29845063; PMCID: PMC5811061, 149-156, 15(3).
Kalbermatten, D. F., et al., "Schwann Cell Strip for Peripheral Nerve Repair", vol. 33, No. 5, Oct. 1, 2008, 587-594.
Koppes, R. A., et al., "Thermally drawn fibers as nerve guidance scaffolds", Biomaterials, vol. 81, 2016, pp. 27-35.
McGrath AM, Brohlin M, Wiberg R, Kingham PJ, Novikov LN, Wiberg M, Novikova LN, Long-Term Effects of Fibrin Conduit with Human Mesenchymal Stem Cells and Immunosuppression after Peripheral Nerve Repair in a Xenogenic Model, May 31, 2018, Cell Med. doi: 10.1177/2155179018760327. PMID: 32634185; PMCID: PMC6172997, 1-13, 10.
Musavi, L., et al., "Muscle-derived stem cells: important players in peripheral nerve repair", Expert Opinion on Therapeutic Targets, vol. 22, No. 12, 2018, ISSN: 1472-8222, pp. 1009-1016.
Neuman K, Kenney A, Koppes R., Investigating Olfactory Mucosa-derived Mesenchymal Stem Cells (OM-MSCs) for Peripheral Nerve Repair, Society for Biomaterials Annual Meeting (2021).
Neuman, K., et al., "Investigating Olfactory Mucosa derived Mesenchymal Stem Cells (OM-MSCs) for Peripheral Nerve Repair", Department of Chemical Engineering, Dec. 4, 2020, 2 pages.
Salehi, M., et al., "Alginate/chitosan hydrogel containing olfactory ectomesenchymal stem cells for sciatic nerve tissue engineering", J Cell Physiol., vol. 234, No. 15, 2019, pp. 12 pages.
Sanen, K., et al., "Engineered neural tissue with Schwann cell differentiated human dental pulp stem cells: potential for peripheral nerve repair?", Journal of Tissue Engineering and Regenerative Medicine, vol. 11, 2017, pp. 3362-3372.
Yu, Z., et al., "Repair of Peripheral Nerve Sensory Impairments via the Transplantation of Bone Marrow Neural Tissue-Committed Stem Cell-Derived Sensory Neurons", Cellular and Molecular Neurobiology, vol. 39, 2019, pp. 341-353.
Zarbakhsh S, Goudarzi N, Shirmohammadi M, Safari M., Histological Study of Bone Marrow and Umbilical Cord Stromal Cell Transplantation in Regenerating Rat Peripheral Nerve, Cell J. 2016 Winter, doi: 10.22074/cellj.2016.3839. Epub Jan. 17, 2016. PMID: 26862526; PMCID: PMC4746417, 668-77, 17(4).
Zarbakhsh S, Khanmohammadi N, Bakhtiari M., The Comparison of Schwann Cells Transplantation Effect with Autograft Model in Peripheral Nerve Regeneration in Animal Model, Iran South Med J 2016, 799-808, 19(5), http://ismj.bpums.ac.ir/article-1-828-en.html.

* cited by examiner

DIFFERENTIATION OF OLFACTORY MUCOSA DERIVED MESENCHYMAL STEM CELLS TO SCHWANN CELLS FOR PERIPHERAL NERVE REPAIR

RELATED APPLICATION

This application claims the benefit of U.S. Provisional Application No. 63/178,527, filed on Apr. 23, 2021. The entire teachings of the above application are incorporated herein by reference.

BACKGROUND

Schwann cells (SCs) are often chosen as support cells in a tissue construct aimed at repairing peripheral nerve injuries. The delivery of additional SCs has been successful in facilitating a more conducive microenvironment to bridge large repairs. While SCs offer benefits that support nerve regeneration, they are invasive to retrieve and can result in donor site morbidity.

SUMMARY

In one aspect, the present disclosure provides a method of treating nerve trauma in a subject in need thereof, the method comprising: propagating olfactory mucosa-derived mesenchymal stem cells (OM-MSC) from the nasal cavity of the subject in schwann cell conditioned media (SCCM) (e.g., for at least about 14-21 days); isolating differentiated olfactory mucosa-derived mesenchymal stem cells (dOM-MSC); seeding the isolated dOM-MSCs on an implantable conduit; and implanting the conduit in the subject in need thereof.

In another aspect, the present disclosure provides a method of treating nerve trauma in a subject in need thereof, the method comprising: isolating olfactory mucosa-derived mesenchymal stem cells (OM-MSC) from the nasal cavity of the subject; propagating the isolated OM-MSCs in schwann cell conditioned media (SCCM) for at least about 14-21 days; isolating differentiated olfactory mucosa-derived mesenchymal stem cells (dOM-MSC); seeding the isolated dOM-MSCs on an implantable conduit; and implanting the conduit in the subject in need thereof.

In certain aspects, the disclosure provides for a method of repairing a damaged nerve, comprising: propagating isolated olfactory mucosa-derived mesenchymal stem cells (OM-MSC) in schwann cell conditioned media (SCCM) for at least about 14-21 days; isolating differentiated olfactory mucosa-derived mesenchymal stem cells (dOM-MSC); seeding the isolated dOM-MSCs on an implantable conduit; and implanting the conduit in the subject in need thereof.

In certain other aspects, the disclosure provides for a method of repairing a damaged nerve, comprising: obtaining isolated olfactory mucosa-derived mesenchymal stem cells (OM-MSC); propagating the isolated OM-MSCs in schwann cell conditioned media (SCCM) for at least about 14-21 days; isolating differentiated olfactory mucosa-derived mesenchymal stem cells (dOM-MSC); seeding the isolated dOM-MSCs on an implantable conduit; and implanting the conduit in the subject in need thereof.

In still further embodiments, the disclosure provides for a method of differentiating olfactory mucosa-derived mesenchymal stem cells comprising: propagating isolated olfactory mucosa-derived mesenchymal stem cells (OM-MSC) in schwann cell conditioned media (SCCM) for at least about 14-21 days; isolating differentiated olfactory mucosa-derived mesenchymal stem cells (dOM-MSC); thereby obtaining dOM-MSCs. In certain embodiments, the step of propagating the OM-MSCs is conducted in schwann cell conditioned media (SCCM). In some aspects, the disclosure provides for the step of propagating the OM-MSCs in SCCM is conducted over a period of at least about 14-21 days.

In yet further embodiments, the disclosure provides for a method of differentiating olfactory mucosa-derived mesenchymal stem cells comprising: obtaining isolated olfactory mucosa-derived mesenchymal stem cells (OM-MSC); propagating the isolated OM-MSCs in schwann cell conditioned media (SCCM) for at least about 14-21 days; isolating differentiated olfactory mucosa-derived mesenchymal stem cells (dOM-MSC); thereby obtaining dOM-MSCs. In certain embodiments, the step of propagating the OM-MSCs is conducted in schwann cell conditioned media (SCCM). In some aspects, the disclosure provides for the step of propagating the OM-MSCs in SCCM is conducted over a period of at least about 14-21 days.

In some embodiments, the differentiated olfactory mucosa-derived mesenchymal stem cells of the disclosure have increased neuroepithelial stem cell protein (Nestin) expression.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A shows OM-MSCs expressing endoglin (CD105), a mesenchymal stem cell marker. FIG. 1B shows OM-MSCs expressing S100β, a glial marker. FIG. 1C shows OM-MSCs expressing p75NTR, a neurotrophic receptor. For FIGS. 1A-C, Cell nuclei were visualized with DAPI and cell cytoskeleton was visualized with Actin Filament (stained with Phalloidin); Scale Bar=100 μm.

FIG. 2A shows SCs expressing S100β, a glial marker. FIG. 2B shows cell nuclei visualized with DAPI. FIG. 2C is a merged image of S100β and cell nuclei, demonstrating the purity of the isolated SC population. For FIGS. 2A-C, Scale Bar=200 μm.

FIG. 3A shows OM-MSCs after culturing in SCCM for 7 days, arrows indicate the emergence of smaller, elongated, bipolar cells. FIG. 3B shows OM-MSCs after culturing in SCCM for 14 days. FIG. 3C shows OM-MSCs after culturing in SCCM for 21 days, this image displays the morphology as well as the aligned parallel growth typical of a SC. FIG. 3D depicts a brightfield image of SCs that were used to produce SCCM. FIG. 3D shows the morphology of Schwann cells (SCs) cultured in basic culture media (DMEM; Dulbecco's Modified Eagle's Medium with 4.5 g/L glucose, L-glutamine, sodium pyruvate) supplemented with 10% (v/v) Fetal Bovine Serum (FBS), 50 U/mL Penicillin/Streptomycin, 6.6 mM Forskolin (Sigma) and 10 μg/mL Bovine Pituitary Extract (BPE) for 2-3 days. For FIGS. 3A-D, Scale Bar=200 μm.

FIG. 4A shows dOM-MSCs expressing S100β. FIG. 4B shows dOM-MSCs decrease expression of Actin filaments compared to undifferentiated cells. FIG. 4C shows dOM-MSCs increase expression of Nestin (a regenerative glial cell marker) compared to undifferentiated cells. FIG. 4D shows a merged image of fluorescent tagging (S100β=orange, Nestin=red, Actin Filament=green, Cell nuclei (stained with DAPI)=blue). For FIGS. 4A-D, Scale Bar=100 µm.

FIG. 5A shows dOM-MSCs maintain expression of S100β. FIG. 5B shows dOM-MSCs increase the expression of Nestin compared to undifferentiated cells. FIG. 5C shows a merged image of fluorescent tagging (S100β=green, Nestin=red, Cell nuclei (stained with DAPI)=blue). FIG. 5D shows dOM-MSCs maintain their expression of CD105. FIG. 5E shows dOM-MSCs decrease the expression of Actin filaments compared to undifferentiated cells. FIG. 5F shows a merged image of fluorescent tagging (CD105=orange, Actin Filament=purple, Cell nuclei (stained with DAPI)=blue). For FIGS. 5A-F, Scale Bar=200 µm.

FIG. 6A shows concentration of NGF in SCCM, OM-MSC conditioned media, and dOM-MSC conditioned media (SCCM, 14 days). SCCM contained significantly more NGF compared to OM-MSCs conditioned media and dOM-MSCs conditioned media (SCCM, 14 days), implicating NGF as a neurotrophic factor being up taken the OM-MSCs, playing a part in the differentiation of the OM-MSCs. FIG. 6B shows concentration of BDNF in SCCM, OM-MSC conditioned media, and dOM-MSC conditioned media (SCCM, 14 days). dOM-MSC conditioned media (SCCM, 14 days) contained significantly more BDNF compared to OM-MSC condition media, indicating that BDNF may play a lesser role in the differentiation of OM-MSCs when placed in SCCM.

FIG. 7A shows dOM-MSCs maintain expression of S100β. FIG. 7B shows minimal changes in Nestin expression after ChI. FIG. 7C shows a merged image of fluorescent tagging (S100β=green, Nestin=red, Cell nuclei (stained with DAPI)=blue). FIG. 7D shows dOM-MSCs maintain their expression of CD105. FIG. 7E shows minimal changes in actin filament expression after ChI. FIG. 7F shows a merged image of fluorescent tagging (CD105=orange, Actin Filament=purple, Cell nuclei (stained with DAPI)=blue). For FIGS. 7A-F, Scale Bar=200 µm.

FIG. 8A shows dOM-MSCs maintain expression of S100β. FIG. 8B shows increases in Nestin expression after 14 days in GF cocktail. FIG. 8C shows decreases in Actin filament expression seen after 14 days in GF cocktail. FIG. 8D shows a merged image of fluorescent tagging (S100β=green, Nestin=red, Actin Filament=purple, Cell nuclei (stained with DAPI)=blue). For FIGS. 8A-D, Scale Bar=200 µm.

FIG. 9B. shows quantification of Actin Filament$^-$ cells. The SCCM dOM-MSCs expressed significantly less Actin Filament compared to SCCM at 14 days and the ChI protocol. These results indicate that longer experimental timepoints significantly increases the number of cells that differentiate toward a SC-like cell.

FIG. 10A shows total outgrowth of neurites grown for 5 days without any support cells (No Support Cells), with undifferentiated Olfactory Mucosa Derived Mesenchymal Stem Cells (OM-MSCs), Schwann Cells (SCs), and with Olfactory Mucosa Derived Mesenchymal Stem Cells and SCs at a 50:50 ratio (OM-MSCs+SC). FIG. 10B shows the longest outgrowth of neurites grown for 5 days without any support cells with OM-MSCs, SCs, and OM-MSCs+SC. Image analysis was performed with Image.

EXAMPLE TECHNICAL DESCRIPTION

Figure 1A:
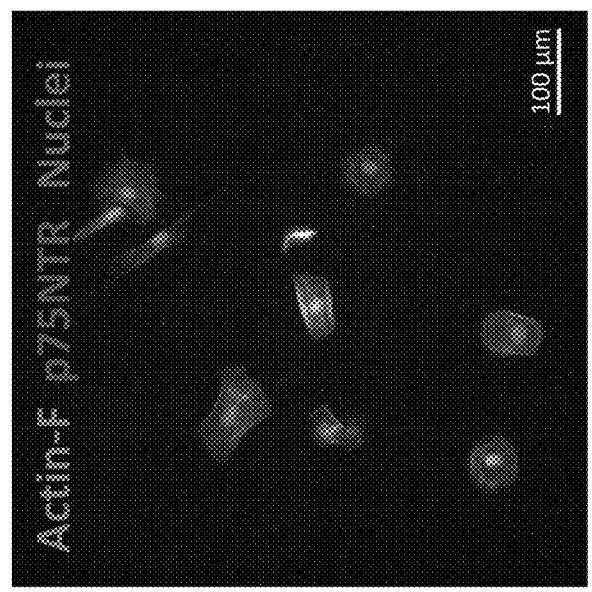
FIGS. 1A-C show immunofluorescent images of the flat, fibroblast-like morphology of Olfactory Mucosa Derived Mesenchymal Stem Cells (OM-MSCs).

A description of example embodiments follows.

Several aspects of the disclosure are described below, with reference to examples for illustrative purposes only. It should be understood that numerous specific details, relationships, and methods are set forth to provide a full understanding of the disclosure. One having ordinary skill in the relevant art, however, will readily recognize that the disclosure can be practiced without one or more of the specific details or practiced with other methods, protocols, reagents, cell lines, and subjects. The present disclosure is not limited by the illustrated ordering of acts or events, as some acts may occur in different orders and/or concurrently with other acts or events. Furthermore, not all illustrated acts, steps, or events are required to implement a methodology in accordance with the present disclosure. Many of the techniques and procedures described, or referenced herein, are well understood and commonly employed using conventional methodology by those skilled in the art.

Unless otherwise defined, all terms of art, notations, and other scientific terms or terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly-used dictionaries, should be interpreted as having a meaning that is consistent with their meaning in the context of the relevant art and/or as otherwise defined herein.

The terminology used herein is for the purpose of describing particular embodiments only and is not intended to be limiting.

As used herein, the indefinite articles "a," "an," and "the" should be understood to include plural reference unless the context clearly indicates otherwise.

Throughout this specification and the claims which follow, unless the context requires otherwise, the word "comprise," and variations such as "comprises" and "comprising," will be understood to imply the inclusion of, e.g., a stated integer or step or group of integers or steps, but not the exclusion of any other integer or step or group of integers or steps. When used herein, the term "comprising" can be substituted with the term "containing" or "including."

As used herein, "consisting of" excludes any element, step, or ingredient not specified in the claim element. When used herein, "consisting essentially of" does not exclude materials or steps that do not materially affect the basic and novel characteristics of the claim. Any of the terms "comprising," "containing," "including," and "having," whenever used herein in the context of an aspect or embodiment of the disclosure, can in some embodiments, be replaced with the term "consisting of," or "consisting essentially of" to vary the scope of the disclosure.

As used herein, the conjunctive term "and/or" between multiple recited elements is understood as encompassing both individual and combined options. For instance, where two elements are conjoined by "and/or," a first option refers to the applicability of the first element without the second. A second option refers to the applicability of the second element without the first. A third option refers to the applicability of the first and second elements together. Any one of these options is understood to fall within the meaning, and, therefore, satisfy the requirement of the term "and/or" as used herein. Concurrent applicability of more than one of the options is also understood to fall within the meaning, and, therefore, satisfy the requirement of the term "and/or."

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

SCs are a choice for support cells in a tissue construct aimed at repairing peripheral nerve injuries. They reside in the peripheral nerve and are fundamental in the formation and repair of peripheral nerves, producing neurotropic factors and supplying remyelination (Mathot et al., 2020). In the presence of injury, the phenotypes of SCs are altered from their myelinated state to a progenitor-like cell (Clements et al., 2017; Gomez-Sanchez et al., 2017; Syu et al., 2019). This change leads to the ability of the cells to secrete neurotropic factors, clear damaged myelin, express adhesive and axonal cues, initiate an inflammatory response, and proliferate (Clements et al., 2017). All of these characteristics support nerve repair and regeneration after an injury has occurred.

Currently, the field does not understand exactly what factors influence these behaviors. Clements et al. 2017, investigated the transcriptional profiles of bridge Schwann cells (bSCs) and distal stump Schwann cells (dSCs) in a crush injury. They confirmed that these SCs had completely different transcriptional profiles, with the bSCs adapting to increase proliferation and migration similar to that expected of progenitor like cells. In addition, the profiles indicate that the microenvironment is an important factor to consider in peripheral nerve repair (Clements et al., 2017). See also Saheb-Al-Zamani et al. 2013 ("Burden of increased proliferation either stressed or exhausted host SCs within the graft and negatively altered the regenerative micro-environment").

While SCs offer benefits that support nerve regeneration, they are invasive to retrieve. Surgeons need to perform an invasive biopsy on injured patients and then culture the cells to use them (Georgiou et al., 2015). SCs are also limited in amount and often result in donor site morbidity (Kolar et al., 2017; Syu et al., 2019).

Stem cells from the nose can be collected by minimally invasive means, expanded, and then differentiated to Schwann Cells for implantation to treat large-gap nerve injuries. Currently, invasive surgery is required to isolate sacrificial nerves to collect Schwann Cells for repairing injury.

This new source of cells is present in all adults. It does not require invasive surgery and sacrificial nerve retrieval for nerve repair. Due to the propensity of stem cells to be expanded in vitro, the cell source can be isolated from the patient and expanded, and then used to provide a substantial source of Schwann Cells for peripheral nerve repair.

For large-gap peripheral nerve repair, surgeons isolate the Sural nerve from the leg (~40 cm in length) to provide both a structure and supportive Schwann Cells to encourage regeneration of the damaged nerve. That source is severely limited, and embodiments of the invention described herein could provide a less invasive and more robust cell source of Schwann Cells for repair.

Injuries create a large burden on the U.S. economy. Embodiments of this technology could improve the percent of patients that fully recover, the rate of recovery, and return to the labor force. Additionally, this could reduce Operating Room (OR) time by eliminating the need for Sural nerve surgery prior to repair.

Embodiments of the method provides a greater source per patient. This should be directly related to the degree of repair a surgeon can achieve, the rate of recovery, and the total return to function.

Clinical peripheral nerve repair with synthetic or cadaveric nerve scaffolds.

Treatment of disorders that induce demyelination of the nerve where a new source of healthy Schwann Cells is required.

Basic discovery and efficacy testing for academic and private research laboratories.

The treatment of peripheral nerve injury.

The treatment of demyelination disorders.

Methods and Compositions of the Disclosure

In some embodiments, the disclosure provides for methods of treatment. As used herein, "therapy," "treat," "treating," or "treatment" means inhibiting or relieving a condition in a subject in need thereof. For example, a therapy or treatment refers to any of: (i) the prevention of symptoms associated with a disease or disorder; (ii) the postponement of development of the symptoms associated with a disease or disorder; and/or (iii) the reduction in the severity of such symptoms that will, or are expected, to develop with said disease or disorder. The terms include ameliorating or managing existing symptoms, preventing additional symptoms, and ameliorating or preventing the underlying causes of such symptoms. Thus, the terms denote that a beneficial result is being conferred on at least some of the subjects (e.g., humans) being treated. Many therapies or treatments are effective for some, but not all, subjects that undergo the therapy or treatment.

In some embodiments, the treatment is directed at treatment of diabetic nerve problems, Guillain-Barre syndrome, thoracic outlet syndrome. In some aspects, treatment is designed to ameliorate, reduce, or eliminate numbness, pain, burning or tingling, muscle weakness, and/or sensitivity to touch.

As used herein, the term "effective amount" means an amount of a composition, that when administered alone or in combination to a cell, tissue, or subject, is effective to achieve the desired therapy or treatment under the conditions of administration. For example, an effective amount is one that would be sufficient to bring about effectiveness of a therapy or treatment. The effectiveness of a therapy or treatment (e.g., eliciting regeneration or repair of a nerve) can be determined by suitable methods known in the art.

In some embodiments the subject is about 0-2 years, 2-3 years, 4-6 years, 7-10 years, 11-12 years, 11-15 years, 16-18 years, 18-20 years, 20-25 years, 25-30 years, 30-35 years, 30-40 years, 35-40 years, 30-50 years, 30-60 years, 50-60 years, 60-70 years, 50-80 years, 70-80 years, 80-90 years, or older than 60 years.

As used herein, "subject" or "patient" includes humans, domestic animals, such as laboratory animals (e.g., dogs, monkeys, pigs, rats, mice, etc.), household pets (e.g., cats, dogs, rabbits, etc.) and livestock (e.g., chickens, pigs, cattle (e.g., a cow, bull, steer, or heifer), sheep, goats, horses, etc.), and non-domestic animals. In some embodiments, a subject is a mammal (e.g., a non-human mammal). In some embodiments, a subject is a human. In still further embodiments, a subject of the disclosure may be a cell, cell culture, tissue, organ, or organ system.

In some aspects, the nerve repair of the present disclosure is an allograph. In some aspects, the nerve repair is an autograph. In still further embodiments, the nerve repair synthetic or partially synthetic. In some aspects, the nerve trauma is peripheral nerve trauma. In other aspects, the nerve trauma is brachial plexus nerve trauma, peroneal nerve trauma, femoral nerve trauma, lateral femoral cutaneous nerve trauma, sciatic nerve trauma, spinal accessory nerve trauma, or tibial nerve trauma. In certain aspects, the trauma to be repaired is to motor nerves, sensory nerves, or atomic nerves. In some embodiments, the nerve trauma is resultant from trauma, iatrogenic intervention, or a combination thereof. In some aspects, the trauma comprises loss of a segment of nerve.

In some aspects of the disclosure, treatment is in combination with known treatments. In some embodiments, the treatment of the disclosure is in combination with antiseizure medication. In other embodiments, the treatment of the disclosure is in combination with nerve blocks. In still further embodiments, the treatment of the disclosure is for treatment of autonomic neuropathy, burning feet, Cauda Equina Syndrome, Cervical Radiculopathy, Chronic Inflammatory Demyelinating Polyneuropathy, Dysautonomia, Giant Axonal Neuropathy, Glossopharyngeal Neuralgia, Hereditary Neuropathies, Hereditary Spastic Paraplegia, Isaac's Syndrome, Paresthesia, Pinched Nerve, or Ulnar Nerve Entrapment (Cubital Tunnel Syndrome).

In one aspect, the present disclosure provides a method of treating nerve trauma in a subject in need thereof, the method comprising: isolating olfactory mucosa-derived mesenchymal stem cells (OM-MSC) from the nasal cavity of the subject; propagating the isolated OM-MSCs in schwann cell conditioned media (SCCM) for at least about 14-21 days; isolating differentiated olfactory mucosa-derived mesenchymal stem cells (dOM-MSC); seeding the isolated dOM-MSCs on an implantable conduit; and implanting the conduit in the subject in need thereof.

In another aspect, the disclosure provides for a method of wherein the SCCM comprises: Dulbecco's Modified Eagle Medium (DMEM); at least about 10% v/v fetal bovine serum (FBS); at least about 50 U/mL antibiotic, wherein the antibiotic is penicillin or streptomycin, or a combination thereof; at least about 2 mM of L-glutamine; at least about 0.01-10 ug/mL bovine pituitary extract (BPE); and at least about 0.06-6.6 μM Forskolin. In still further embodiments, the SCCM further comprises at least one growth factor. In certain embodiments, the growth factor is selected from Nerve Growth Factor (NGF), Brain Derived Neurotropic Factor (BDNF), Glial-cell Derived Neurotropic Factor (GDNF), or a combination thereof.

In certain embodiments of the disclosure, the concentration of at least one growth factor is: at least about 0.0025-2.5 ng/mL Nerve Growth Factor (NGF); at least about 0.003-3 ng/mL Brain Derived Neurotropic Factor (BDNF); and at least about 0.0021-2.1 μg/mL Glial-cell Derived Neurotropic Factor (GDNF). In other aspects, the concentration of NGF is at least about 0.0005, 0.001, 0.002, 0.0025, 0.003, 0.003, 0.004, 0.0045, 0.005, 0.006, 0.007, 0.008, 0.009, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 ng/mL. In other aspects, the concentration of BDNF is at least about 0.0005, 0.001, 0.002, 0.0021, 0.0025, 0.003, 0.003, 0.004, 0.0045, 0.005, 0.006, 0.007, 0.008, 0.009, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.1, 3.2, 3.3, 3.4, 3.5, 3.6, 3.7, 3.8, 3.9, or 4 ng/mL. In other aspects, the concentration of GDNF is at least about 0.0005, 0.001, 0.002, 0.0021, 0.0025, 0.003, 0.003, 0.004, 0.0045, 0.005, 0.006, 0.007, 0.008, 0.009, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 μg/mL.

In certain aspects, the disclosure provides for a method of repairing a damaged nerve, comprising: obtaining isolated olfactory mucosa-derived mesenchymal stem cells (OM-MSC); propagating the isolated OM-MSCs in schwann cell conditioned media (SCCM) for at least about 14-21 days; isolating differentiated olfactory mucosa-derived mesenchymal stem cells (dOM-MSC); seeding the isolated dOM-MSCs on an implantable conduit; and implanting the conduit in the subject in need thereof. In certain aspects, the disclosure provides for propagating cells for at least about 8, 9, 10, 11, 12, 13, 14, 15, 16, 17, 18, 19, 20, 21, 22, 23, or 24 days.

In some embodiments, the method further comprises an implantable nerve guide wherein the implantable guide is a nerve guide conduit. In some embodiments, the nerve guide conduit is configured to conduct an electrical current.

In still further embodiments, the disclosure provides for a method of differentiating and/or expanding a population of olfactory mucosa-derived mesenchymal stem cells comprising: obtaining isolated olfactory mucosa-derived mesenchymal stem cells (OM-MSC); propagating the isolated OM-MSCs in schwann cell conditioned media (SCCM) for at least about 14-21 days; isolating differentiated olfactory mucosa-derived mesenchymal stem cells (dOM-MSC); thereby obtaining dOM-MSCs. In certain embodiments, the step of propagating the OM-MSCs is conducted in schwann cell conditioned media (SCCM). In some aspects, the disclosure provides for the step of propagating the OM-MSCs in SCCM is conducted over a period of at least about 14-21 days. In some embodiments, the disclosure provides for a conduit for promoting regeneration of a severed nerve, comprising differentiated olfactory mucosa-derived mesenchymal stem cells (dOM-MSC).

In some embodiments, the differentiated olfactory mucosa-derived mesenchymal stem cells of the disclosure have increased neuroepithelial stem cell protein (Nestin) expression. In some embodiements, the dOM-MSCs have decreased actin filament expression.

In still further aspects, the disclosure provides for differentiated olfactory mucosa-derived mesenchymal stem cells (dOM-MSC) produced according to the method comprising: obtaining isolated olfactory mucosa-derived mesenchymal stem cells (OM-MSC); propagating the OM-MSCs to at least about 70-90% confluency; identifying and isolating a differentiated olfactory mucosa-derived mesenchymal stem cell (dOM-MSC).

EXEMPLIFICATION

Example 1: OM-MSC Isolation and Immunocytochemistry Characterization

Olfactory Mucosa Derived Mesenchymal Stem Cells (OM-MSCs) were isolated from explants removed from the nasal cavities of 6-week-old Sprague Dawley rats and used to collect multipotent OM-MSCs using established protocols approved by Northeastern University's Institutional Animal Care and Use Committee (19-0104R) and according to a previously established protocol (Girard et al., 2011). A similar protocol has been established for humans.

Briefly, after eliminating facial muscle and excess tissue, the nasal cavities of the rats were exposed with a rongeur. Once exposed, the olfactory turbinates were gently lifted to uncover the olfactory mucosa, located between the ceiling of the nasal cavity, arc of the perpendicular plate and the cribriform plate. Using a 26-gauge needle and forceps, the mucosa was removed and transferred into a petri dish filled with Dulbecco's Modified Eagle Medium/Nutrient Mixture F-12 (DMEM/F-12). The tissue was digested in Dispase II solution (2.4 IU/ml; Sigma Aldrich) for 1 hour at 37° C., then transferred to a Collaganase I (Sigma Aldrich) solution for 10 minutes. The tissue was then dissociated with a pipette and the reaction was terminated with phosphate buffered saline (PBS; Sigma Aldrich). The samples were then centrifuged at 200 g for five minutes. After removing the supernatant, the cell pellet was resuspended in DMEM/F-12 supplemented with 10% (v/v) Fetal Bovine Serum (FBS; Coring) and 50 U/ml Penicillin/Streptomycin (Sigma Aldrich) and plated in a 12-well plate (Thermo Fisher). 1 ml of media was added to each well and exchanged every 2-3 days. The cells were incubated in standard cell culture conditions throughout the duration of all experiments (37° C., 5% $CO_2$).

After cells reached 70-90% confluency (about 2-3weeks), the OM-MSCs were passaged according to standard cell culture procedures and plated either in BioLite™ cell culture 25 cm² vented flasks (Thermo Scientific) to expand and use for further experimentation or on laminin-coated glass coverslips in a 12 well-plate for immunocytochemistry (ICC).

Glass coverslips (12 mm; Fisherbrand) were sterilized with ultraviolet light for 6 minutes per side and treated with plasma for 2minutes using a Harrick Expanded Plasma Cleaner (PDC-002). Then a laminin (Corning) solution, containing laminin, 10× PBS (Sigma Aldrich), and sterile MILLI-Q® water purification system water at a 1:1.5:5 ratio, was applied to the coverslips and incubated at 37° C. for 30 minutes. After 30 minutes, the excess solution was removed and the coverslips were rinsed with sterile water two times. The cells were then seeded on the coverslips and 1 ml of media was added. The cells were incubated for three days before performing ICC. After three days, the cells were fixed with 4% (v/v) paraformaldehyde (PFA; Sigma Aldrich) for 20 minutes and permeabilized with a 0.1% (v/v) TRITON® X detergent (Sigma Aldrich) solution for 12 minutes.

Figure 1B:
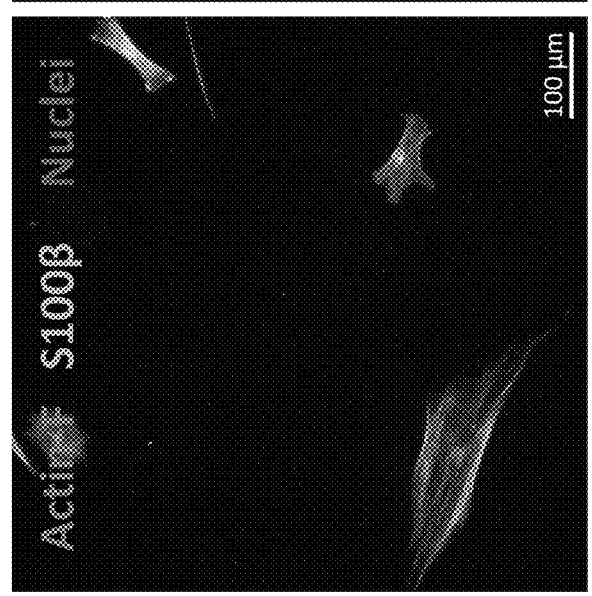
Figure 1C:
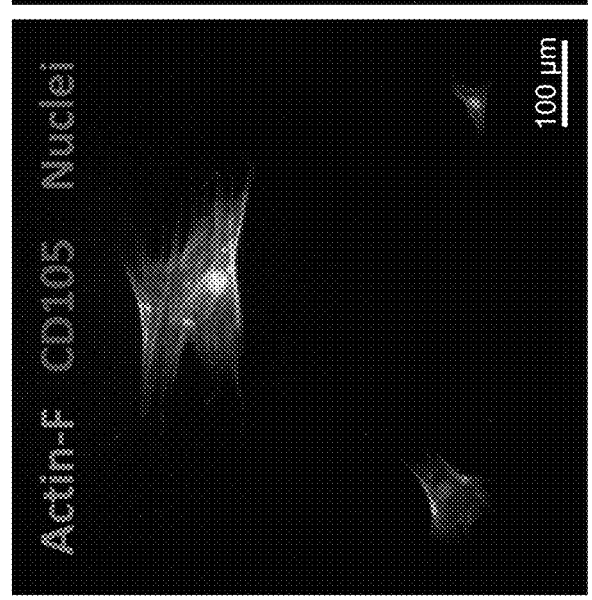
Figures 2A, 2B, 2C:
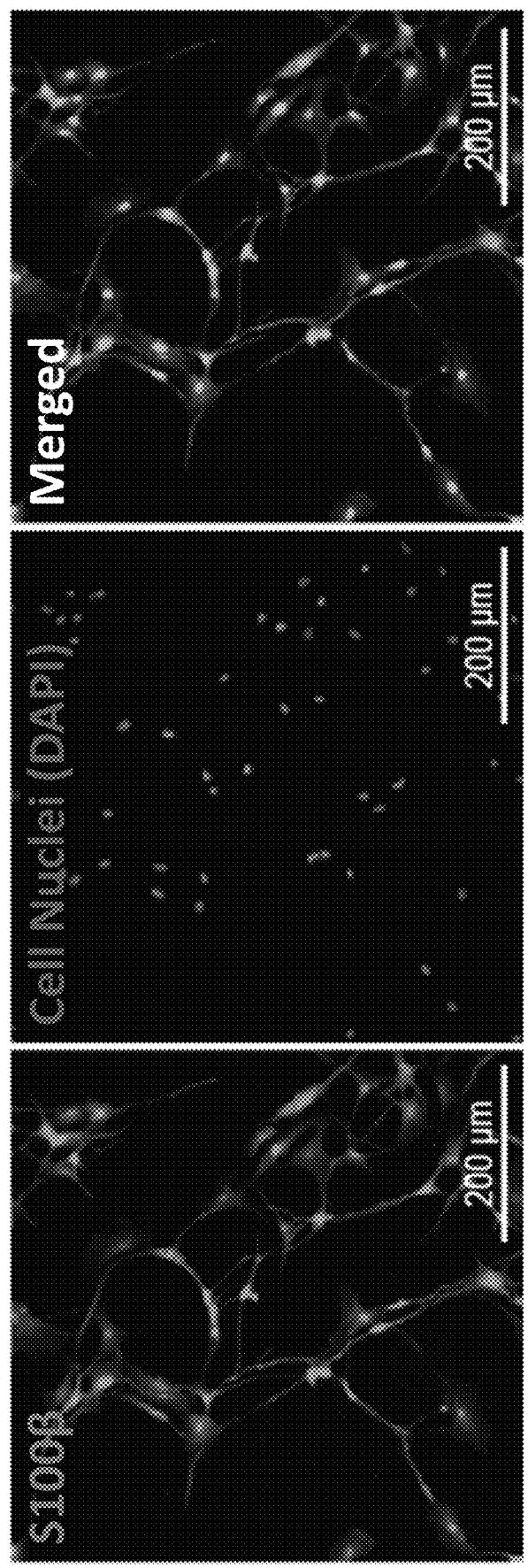
FIGS. 2A-C display immunofluorescent images of elongated, bipolar morphology of Schwann Cells (SCs).

After washing the cells with PBS three times, non-specific antibody binding was blocked with 2.5% (v/v) goat serum (Sigma Aldrich) in PBS for two hours at room temperature. After blocking, primary antibodies [rabbit anti-S100β (Invitrogen: BSM-52506R) (1:250 dilution), rabbit anti-p75NTR (Invitrogen:MA1-18401) (1:250 dilution), mouse anti-CD105 (Invitrogen:bs-0579R) (1:250 dilution)], were diluted in goat serum and added to the cells for one hour at room temperature. After three washes in PBS, secondary antibodies [AlexaFluor™ Phalloidin 546 (Invitrogen: A22283) (1:1000 dilution), Alexa Fluor™ 647 goat anti-rabbit secondary antibody (Invitrogen:A32733) (1:1000 dilution), Alexa Fluor™ 647 goat anti-mouse secondary antibody (Invitrogen:A21240) (1:1000 dilution)], were diluted in goat serum and added to the samples for one hour at room temperature. Secondary antibodies were removed, and samples were again washed three times with PBS. The samples were mounted on a glass slide over a droplet of Prolong™ Gold Antifade Mountant with DAPI (Invitrogen: P36931). Imaging was performed with an upright light microscope (Zeiss Axio Observer; Carl Zeiss Microscopy LLC) (See FIG. 1A-C). Immunofluorescent imaging reveals OM-MSCs express CD105, a mesechymal stem cell marker, S100β, a glial marker, and p75NTR, a neurotrophic receptor. Actin filaments (stained with phalloidin) were also prominent.

Example 2: Schwann Cell Isolation and Immunocytochemistry Characterization

Schwann cells were isolated from postnatal day 2 (p2) Sprague Dawley rats based on previously established methods (Morrissey, Kleitman, & Bunge, 1991). Sciatic nerves were isolated and plated in basic media (Dulbecco's Modified Eagle Medium [DMEM; Hyclone], 10% (v/v) Fetal Bovine Serum [FBS; Coring], 50 U/ml Penicillin/Streptomycin (Sigma Aldrich), 2 mM of L-glutamine [Sigma Aldrich]). SCs were purified from contaminating fibroblasts with an anti-mitotic agent, $10^{-5}$ M cytosine arabinoside (ARAC; Sigma-Aldrich), and complement-mediated cell lysis (anti-CD90/Thy 1.1, Invitrogen). To assess purity, SCs were seeded on laminin coated coverslips and fixed and stained as detailed in example 1 using the goat anti-rabbit S100β antibody rabbit (Invitrogen: BSM-52506R) (1:250 dilution) and Alexa Fluor™ 546 goat anti-rabbit secondary antibody (Invitrogen: A11035) (1:1000 dilution) (See FIG.

2A-C). Spindly morphology and purity >98% was confirmed. Cells were expanded in BioLite™ cell culture 25 cm² vented flasks (Thermo Scientific) t25 in growth media (DMEM, 10% (v/v) FBS, 50 U/ml Penicillin/Streptomycin, 2 mM of L-glutamine, 10 ug/mL Bovine Pituitary Extract [BPE; Gibco], 6.6 µM Forskolin [Sigma Aldrich]) in standard conditions (5% $CO_2$, 37° C.). Media was exchanged every 2-3 days.

Example 3: Brightfield Images of OM-MSCs Cultured in SCCM

Figure 3B:
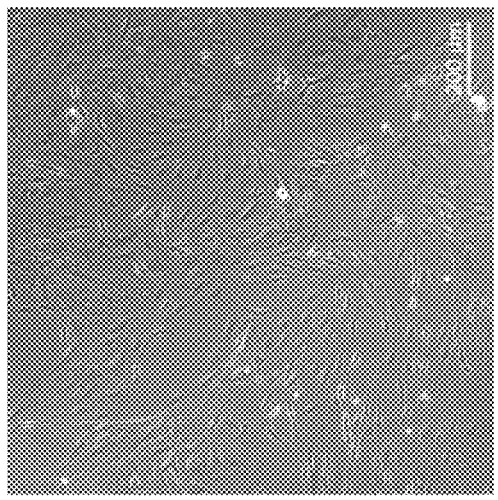
FIGS. 3A-D show brightfield images of the differentiation of OM-MSCs towards a Schwann Cell-like morphology when cultured in Schwann cell-conditioned media (SCCM).
Figure 3D:
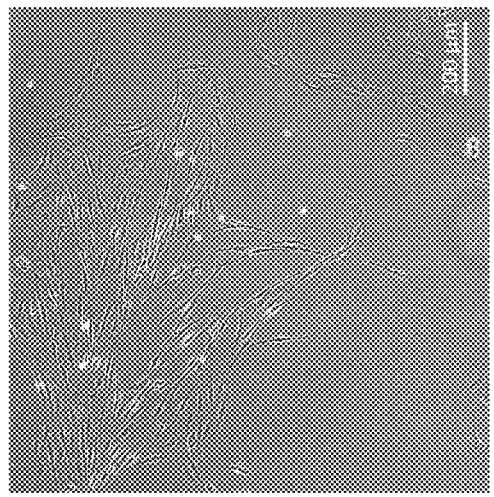
Figure 3A:
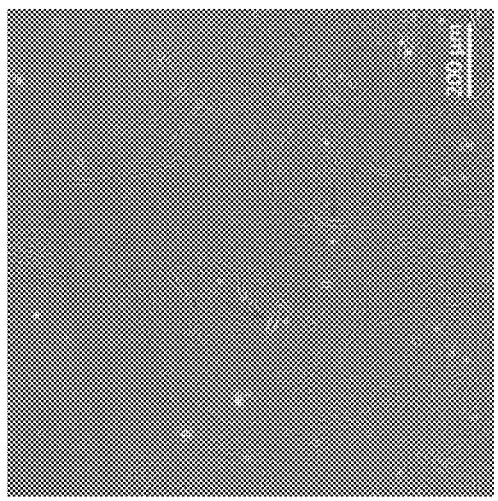
Figure 3C:
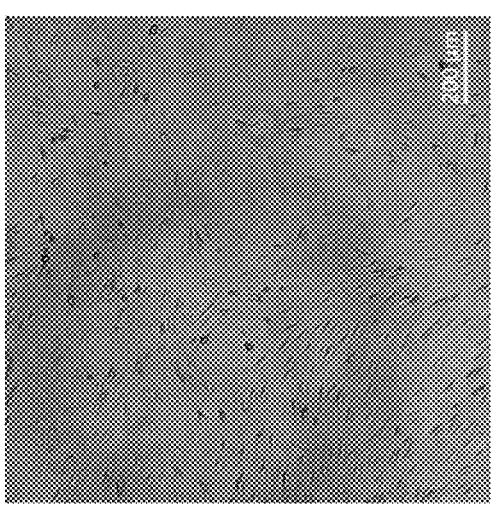
Figure 4B:
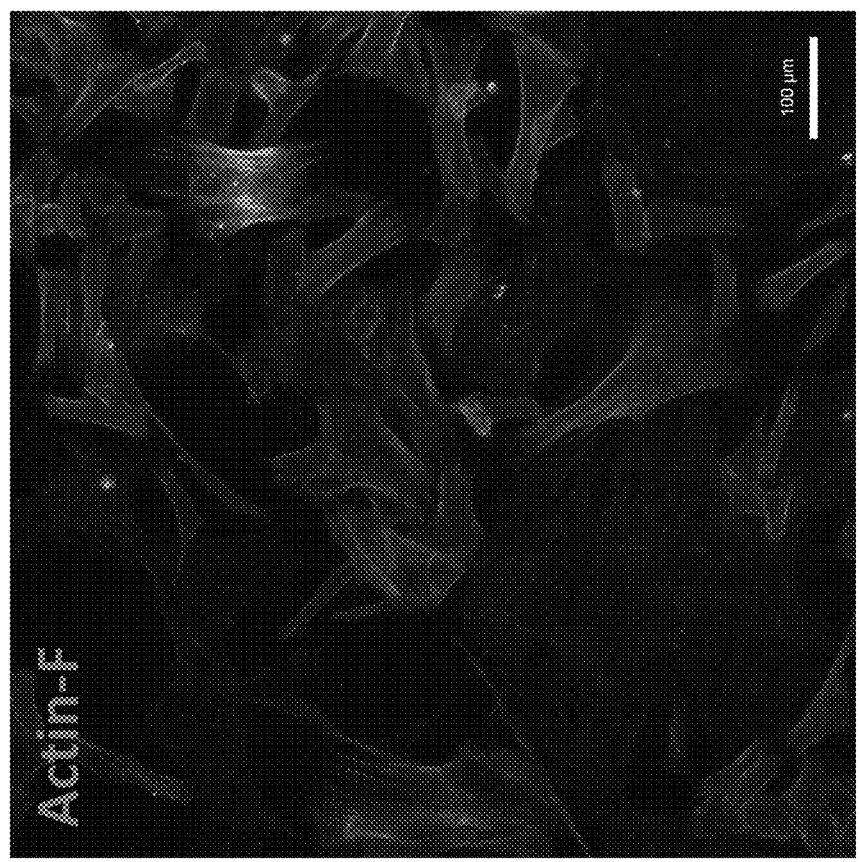
FIGS. 4A-D display immunofluorescent images of differentiated OM-MSCs (dOM-MSCs) after culture in SCCM for 14 days.
Figure 4A:
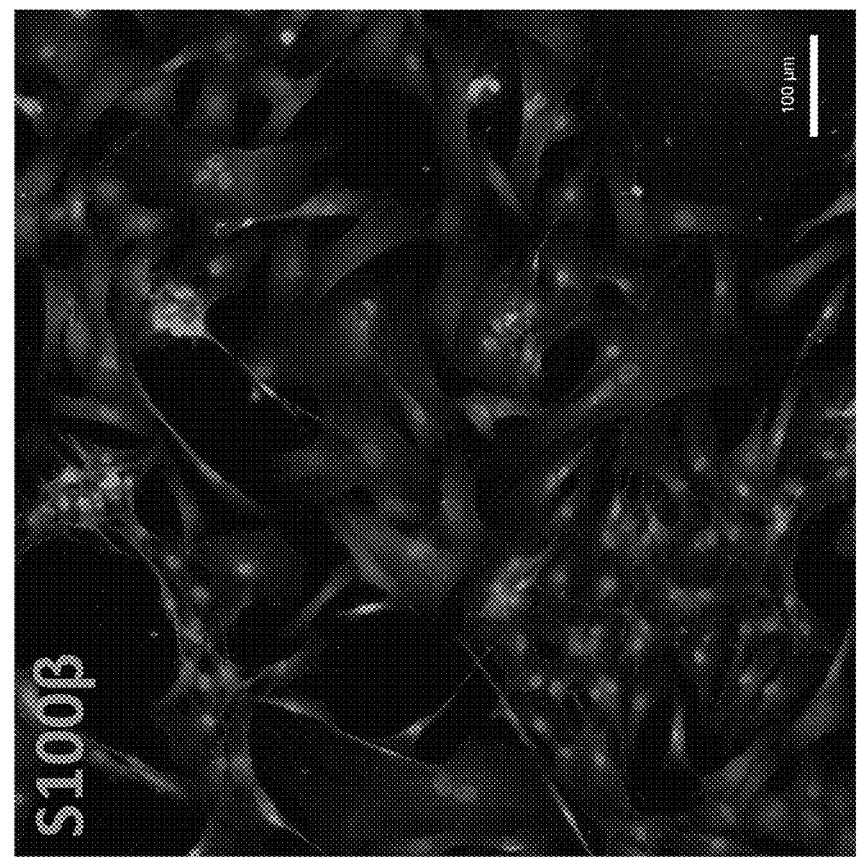
Figure 4D:
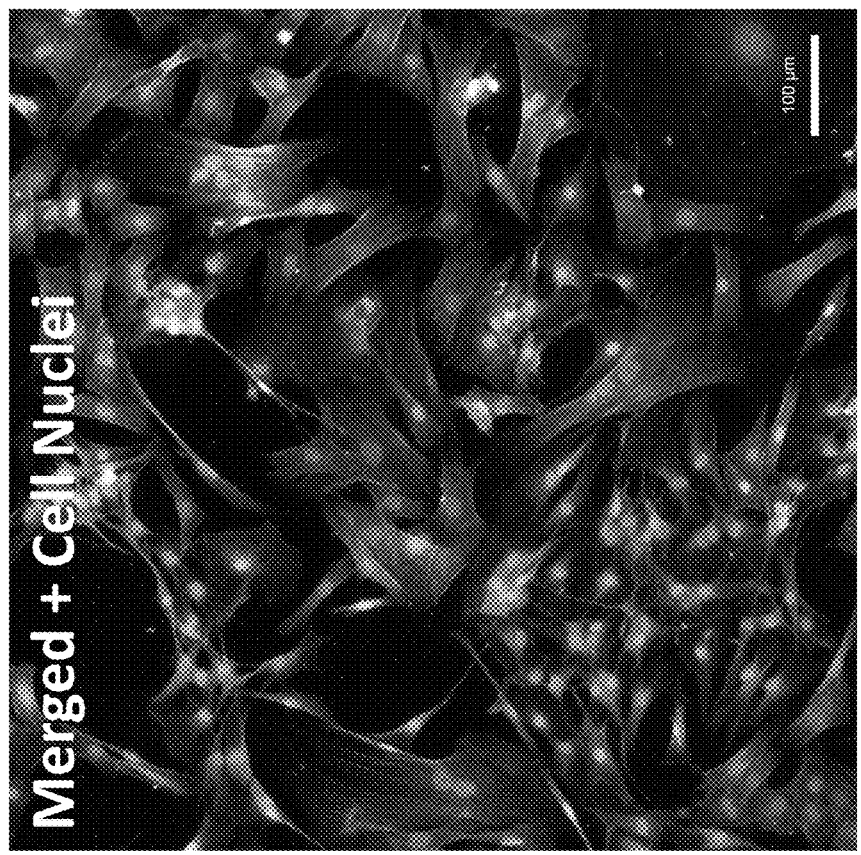
Figure 4C:
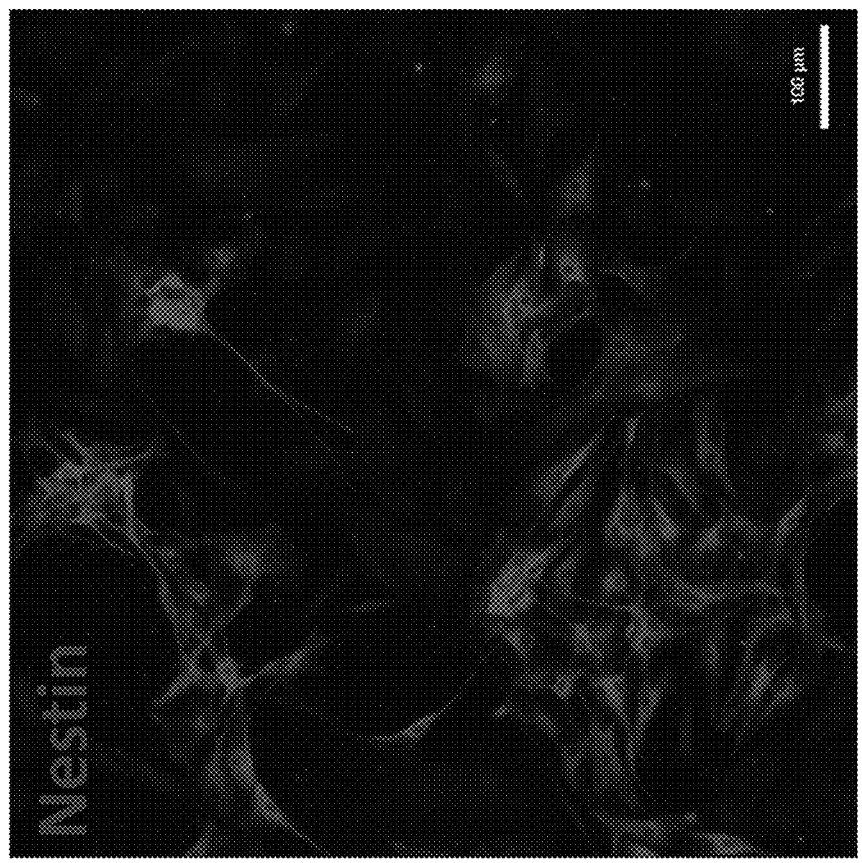
Figure 5B:
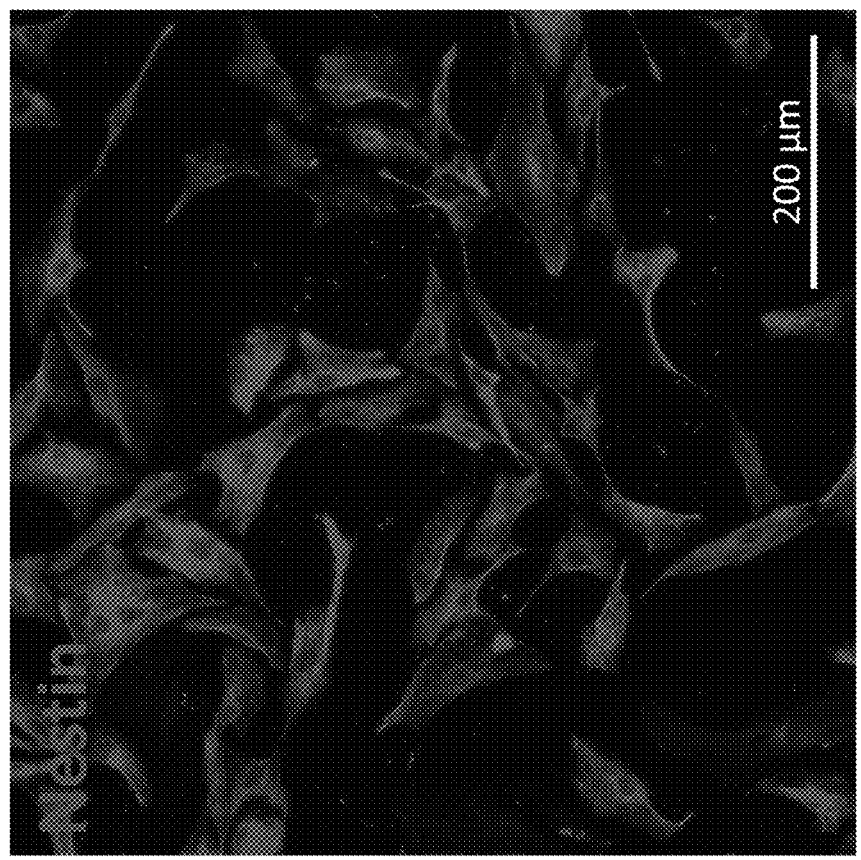
FIGS. 5A-F display immunofluorescent images of differentiated OM-MSCs (dOM-MSCs) after culturing in SCCM for 21 days.
Figure 5A:
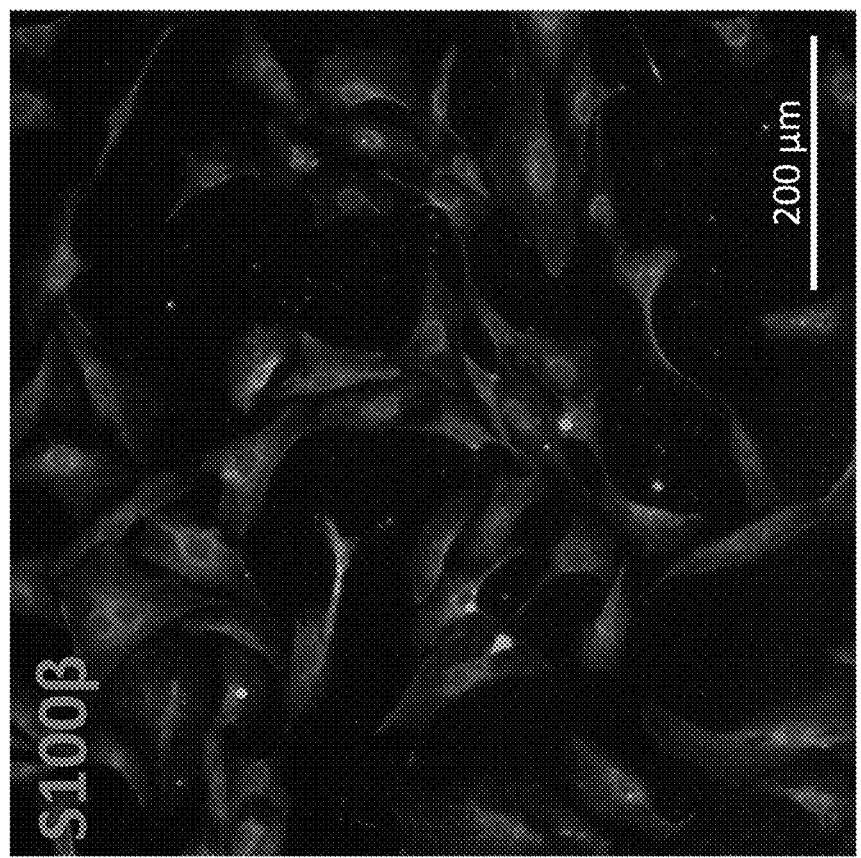
Figure 5D:
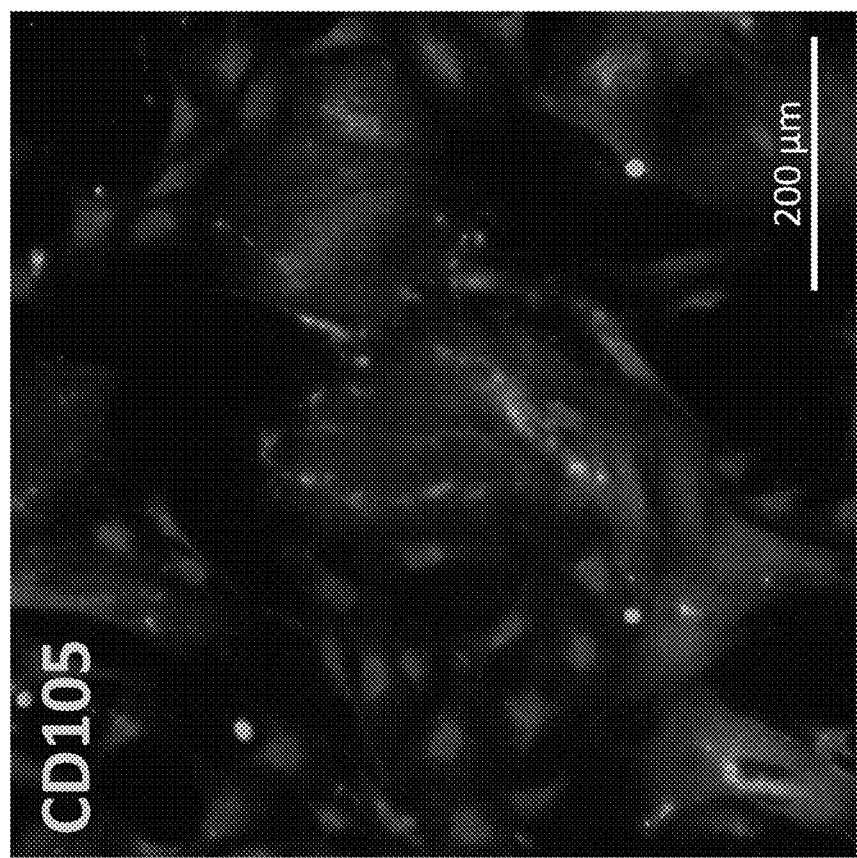
Figure 5C:
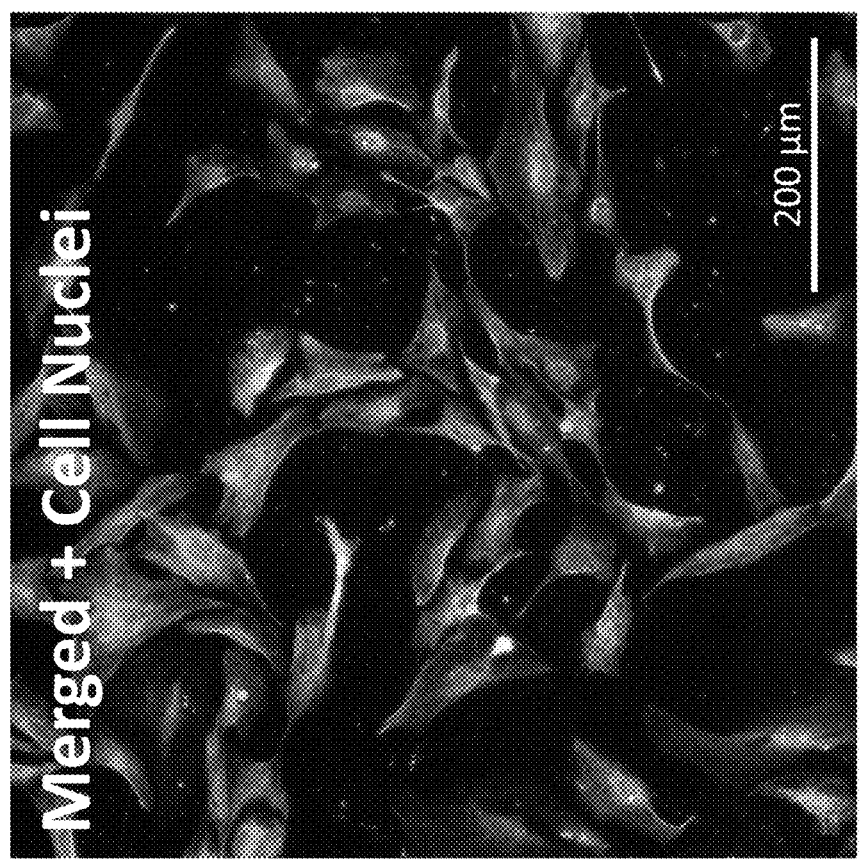
Figure 5F:
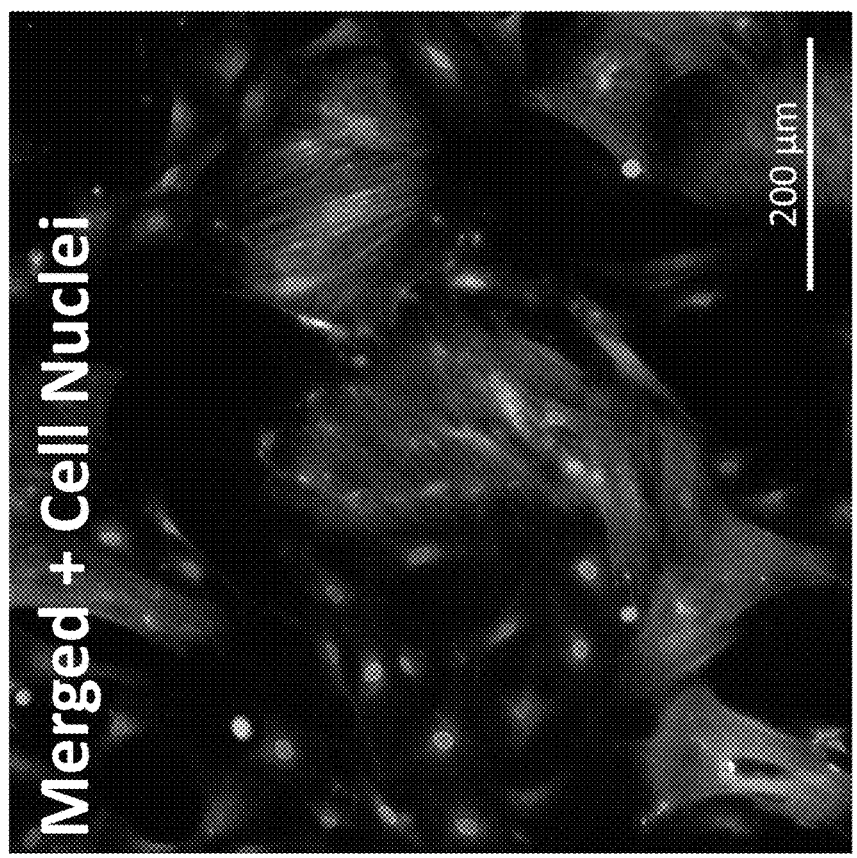
Figure 5E:
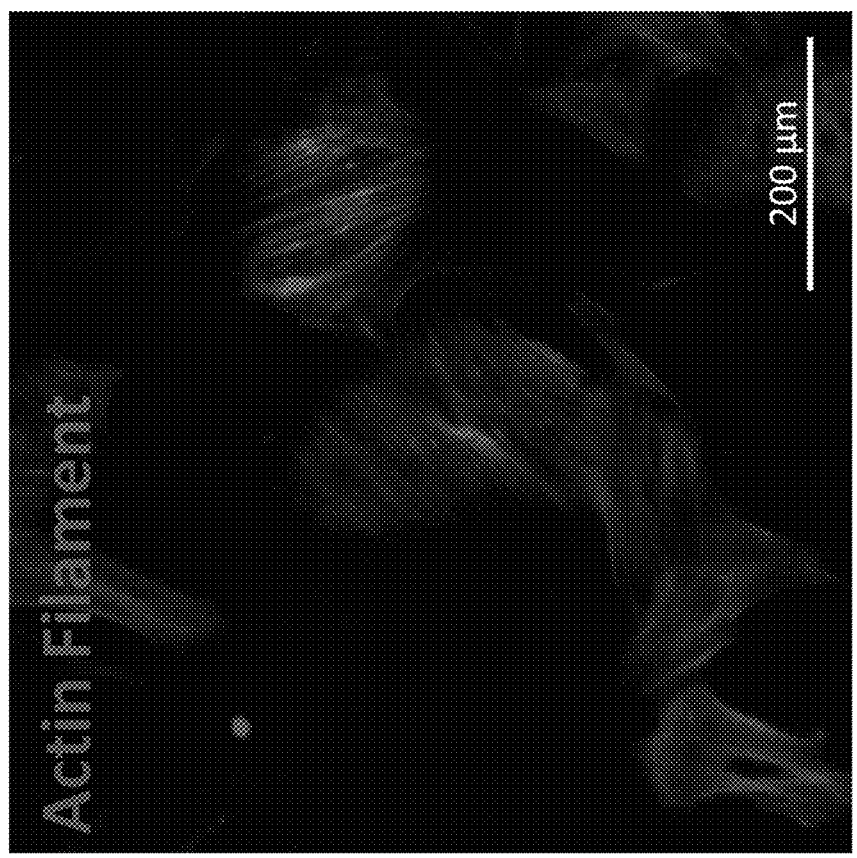

OM-MSCs were cultured in SC conditioned media (media that was cultured on SCs for 2-3 days, removed, and placed on OM-MSCs) for 21 days. Bright field imaging was performed with an upright light microscope (Zeiss Axio Observer; Carl Zeiss Microscopy LLC). Cells were observed at Day 7, Day 14, and Day 21 (See FIG. 3A-C). At Day 7, there are hints of OM-MSCs morphology changes. This becomes more apparent at Day 14 and Day 21, as the distinct smaller, elongated, bipolar morphology of SCs emerges. SCs were imaged in brightfield as a comparison (See FIG. 3D).

Example 4: Immunocytochemistry Characterization of dOM-MSCs

After 14 and 21 days, differentiated OM-MSCs (dOM-MSCs) were plated on laminin coated coverslips. Cells were cultured for 2-3 days to allow adherence, then fixed and stained as detailed in Example 1. Primary antibodies applied were mouse anti-Nestin (Abcam:ab254048) (1:500 dilution), rabbit anti-S100β (Invitrogen) (1:250 dilution), rabbit anti-CD105 (Invitrogen) (1:250 dilution). Secondary antibodies applied were Alexa Fluor™ 546 goat anti-rabbit secondary antibody (Invitrogen:A11035) (1:1000 dilution), Alexa Fluor™ 647 goat anti-rabbit secondary antibody (Invitrogen:A323733) (1:1000 dilution), and Alexa Fluor™ Phalloidin 546 (Invitrogen) (1:1000 dilution). Fluorescent imaging reveals an increase in neuroepithelial stem cell protein (Nestin) positive cells localized in the dOM-MSCs. Nestin is a protein that is indicative of regenerative glial cells and SC precursor cells (Bernal & Arranz, 2018). Additionally, there is a decrease in Actin-Filament expression (stained by Phalloidin) in the cells with SC-like morphology. Cells maintained expression of S100β, a SC marker, and endoglin (CD105), a mesenchymal stem cell marker (See FIGS. 4-5).

Example 5: Neurotrophic Factor Production

Figure 6B:
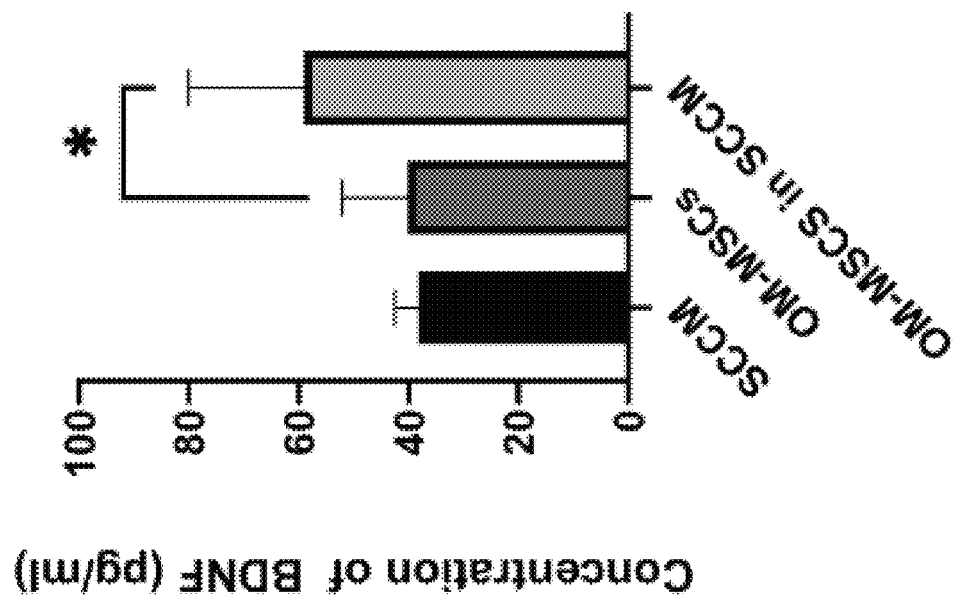
FIGS. 6A-B show quantification of Nerve Growth Factor (NGF) and Brain Derived Neurotrophic Factor (BDNF) in Schwann Cell conditioned media (SCCM), Olfactory Mucosa derived Mesenchymal Stem Cells (OM-MSC) conditioned media and differentiated OM-MSC (dOM-MSC) conditioned media after 14 days. Media was removed from cell culture after 3 days, spun down at 400 g for 5 minutes, and frozen at −80° C. before quantification via enzyme-linked immunoassay (ELISA).
Figure 6A:
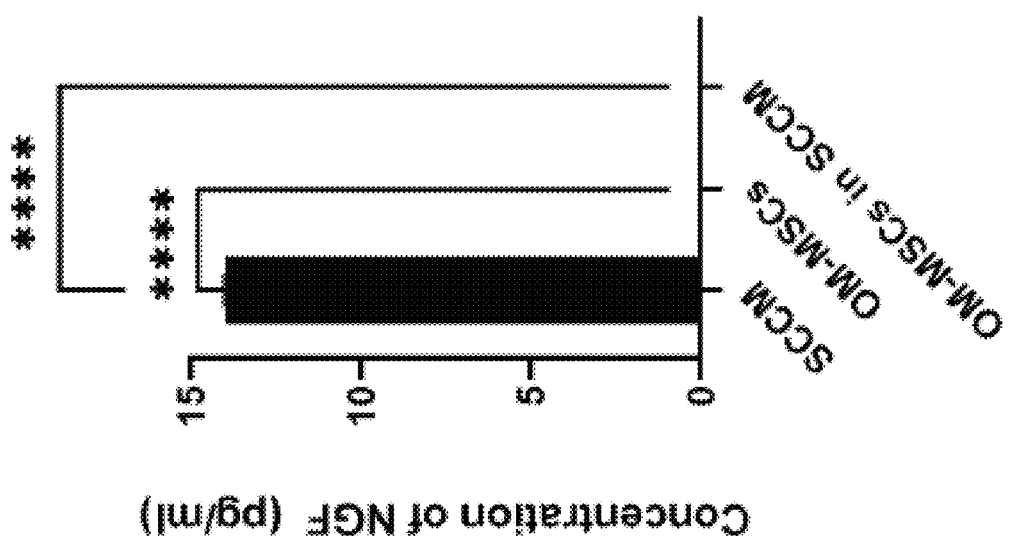
Figure 7B:
FIGS. 7A-F display immunofluorescent images of differentiated OM-MSCs (dOM-MSCs) after Chemical Induction (ChI) protocol (19 days).
Figure 7A:
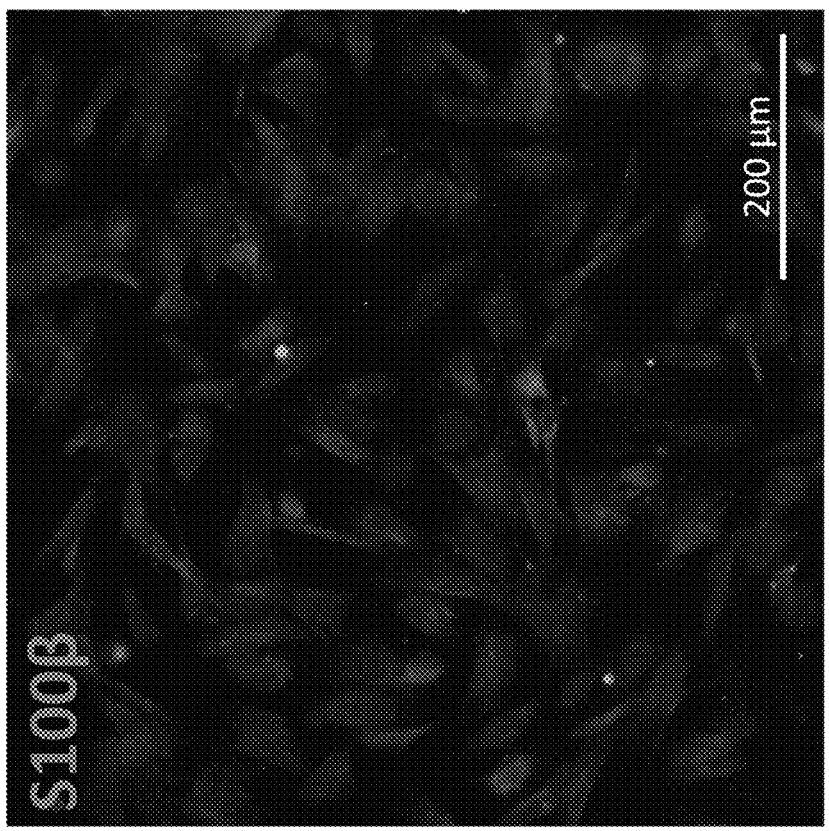
Figure 7D:
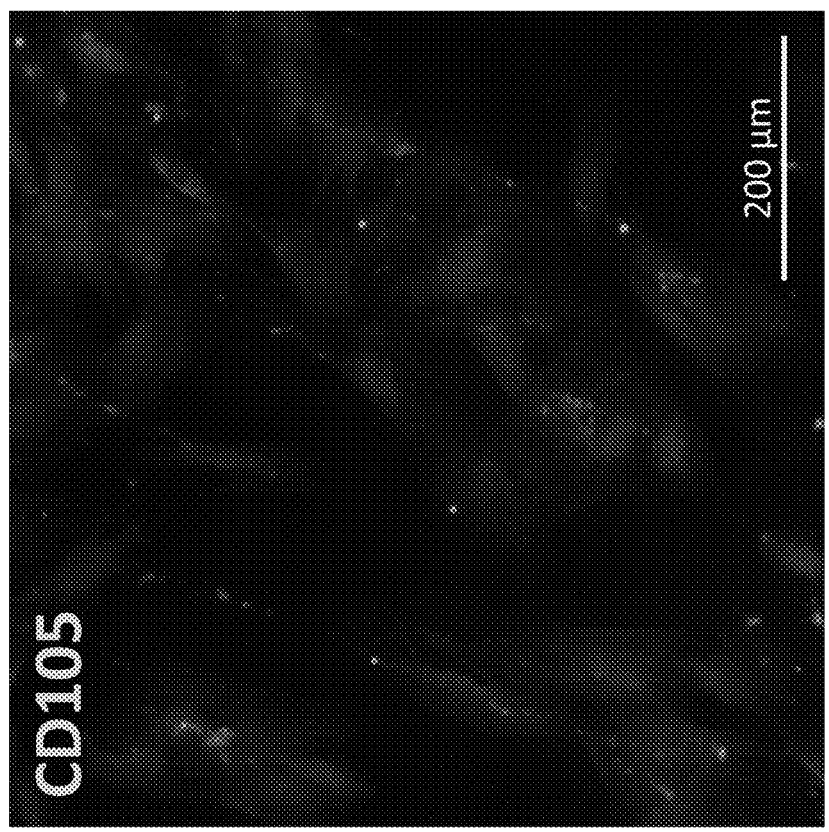
Figure 7C:
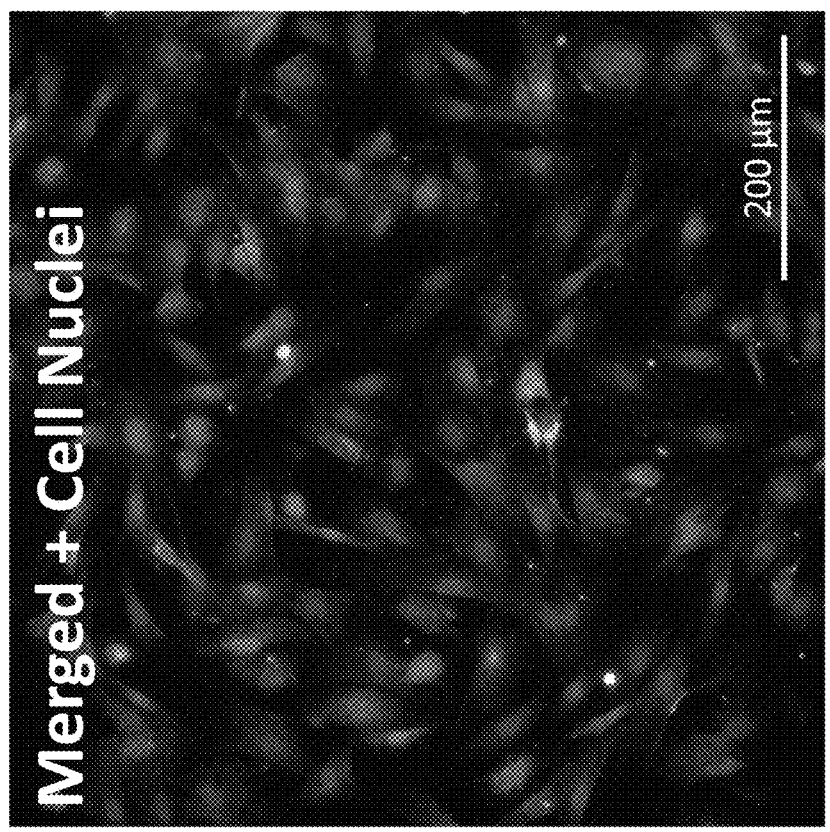
Figure 7F:
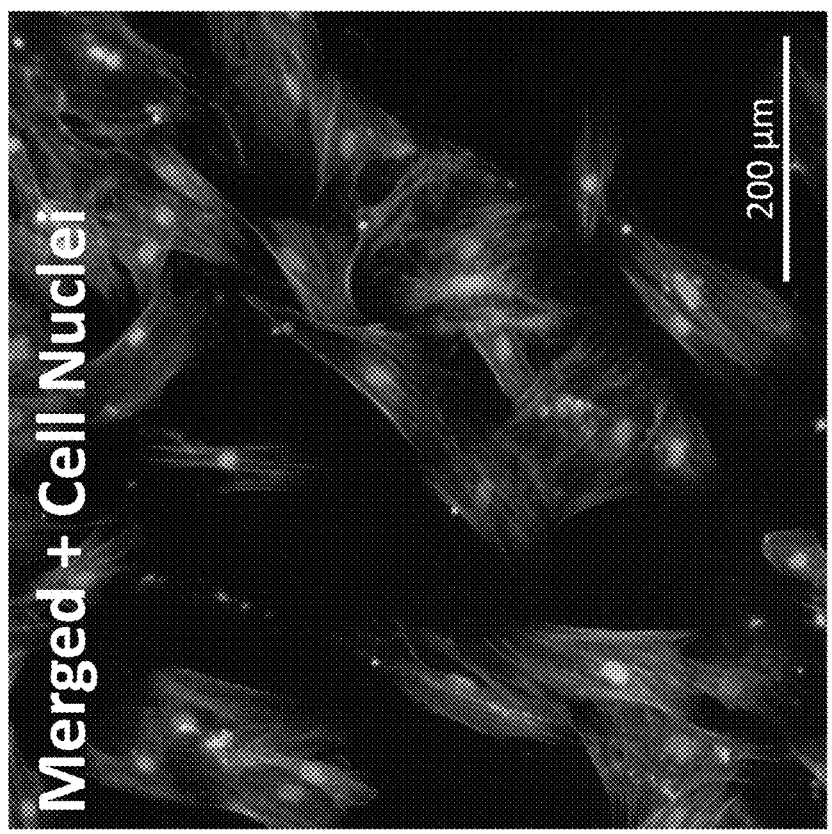
Figure 7E:
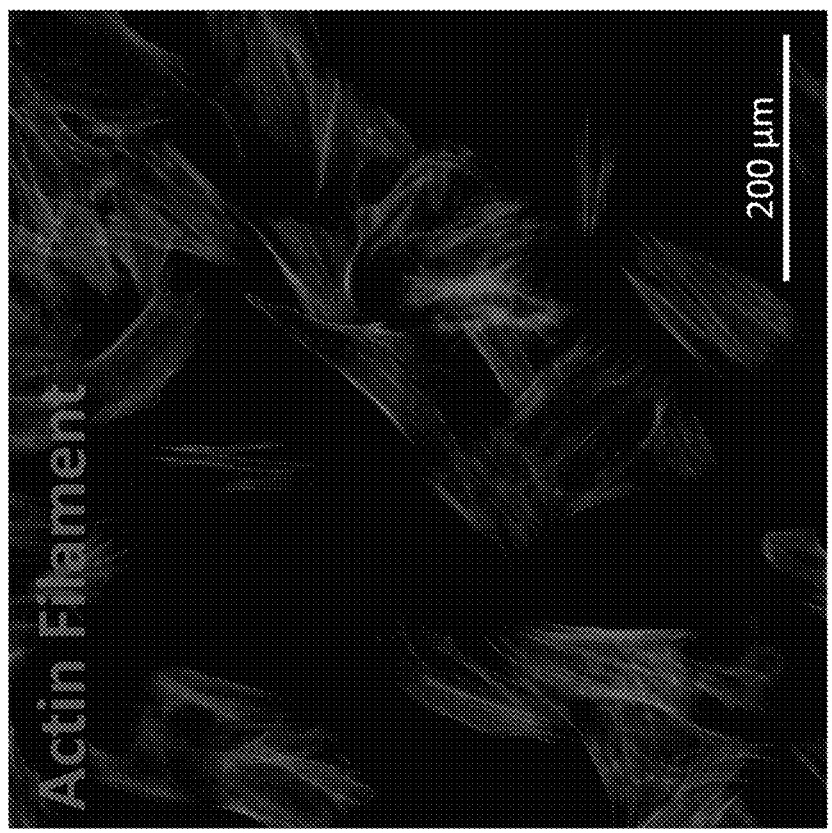
Figure 8B:
FIGS. 8A-D display immunofluorescent images of differentiated OM-MSCs (dOM-MSCs) after culturing OM-MSCs in growth factor cocktail (GF, 14 days): Schwann cell growth media (Dulbecco's Modified Eagle Medium, 10% (v/v) Fetal Bovine Serum, 50 U/ml Penicillin/Streptomycin, 2 mM of L-glutamine, 10 ug/mL Bovine Pituitary Extract, 6.6 µM Forskolin) supplemented with 2.5 ng/ml of Nerve Growth Factor (NGF), 3 ng/ml Brain derived Neurotrophic Factor (BDNF), 2.1 µg/ml of Glial-cell derived Neurotropic Factor (GDNF).
Figure 8A:
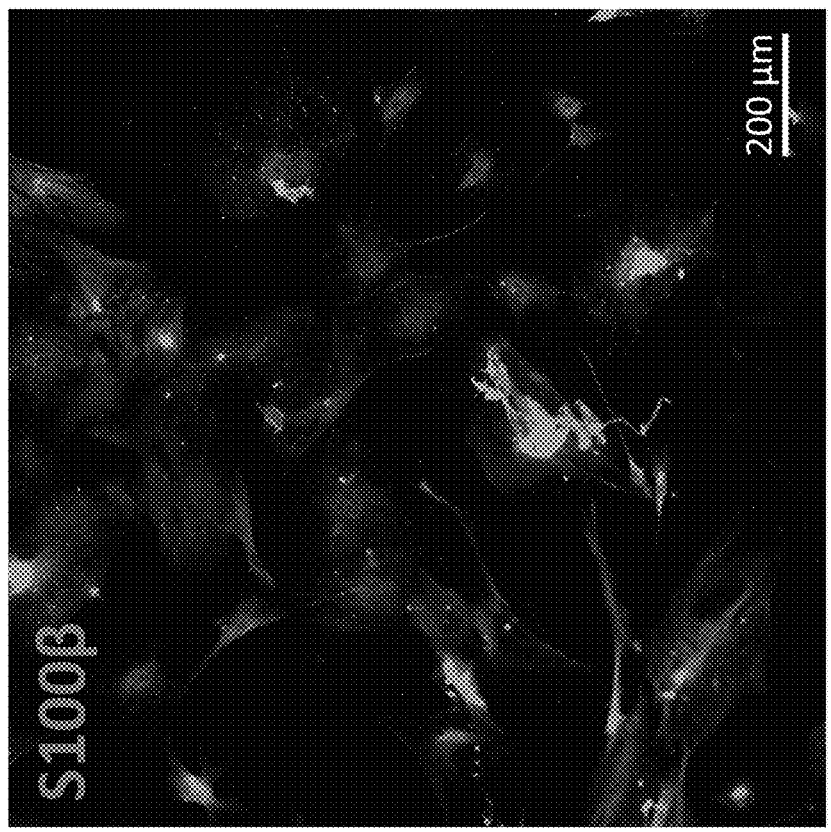
Figure 8D:
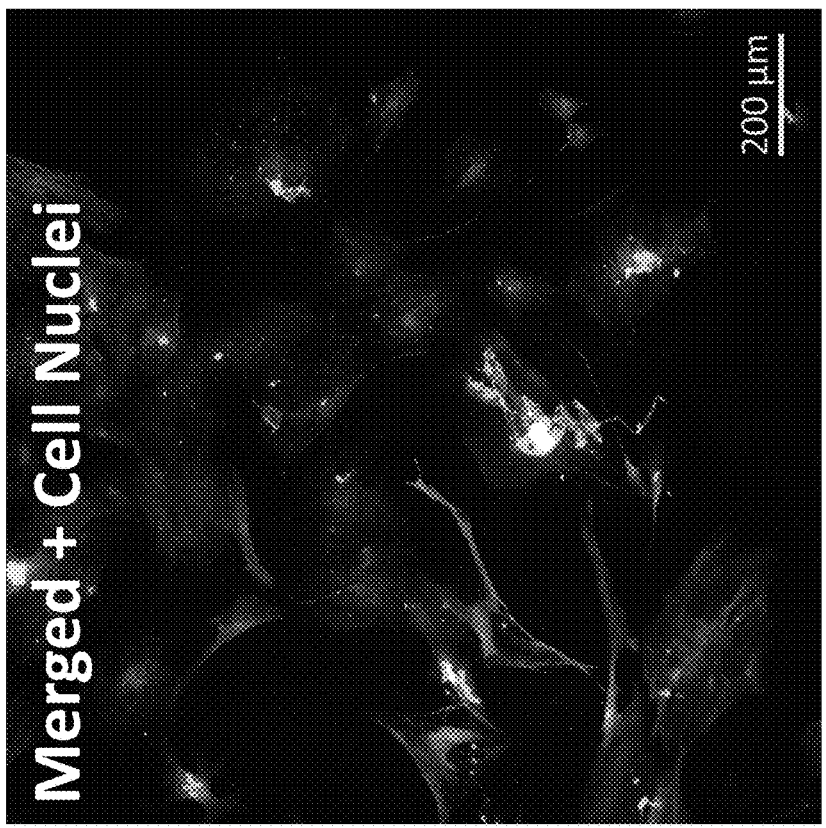
Figure 8C:

The concentrations of two notable neurotrophic factors, nerve growth factor (NGF) and brain derived growth factor (BDNF) were quantified in Schwann cell conditioned media (SCCM), Olfactory Mucosa Derived Mesenchymal Stem Cells (OM-MSCs) conditioned media, and media conditioned by Olfactory Mucosa Derived Mesenchymal Stem Cells (OM-MSCs) after being culture in SCCM for 14 days (OM-MSCs in SCCM). The concentrations of NGF and BDNF were quantified by ELISA (NGF beta Rat ELISA kit, BDNF Rat ELISA Kit, Invitrogen) according to the manufacturer's instructions. The results demonstrate that NGF was not detectable by the ELISA in OM-MSCs. NGF was present in the SCCM, but after culturing this media on the OM-MSCs for two days, no NGF remains (See FIG. 6A). This implicates NGF as a potential neurotrophin that is influencing the change in morphology and phenotype of dOM-MSCs). It was demonstrated that BDNF was produced by SCs, OM-MSCs, and dOM-MSCs (See FIG. 6B). There was a significant increase in BDNF concentration comparing OM-MSCs and dOM-MSCs. This may be in part to the BDNF present in the SCCM as well as additional production by the dOM-MSCs.

Example 6: Chemical Induction Protocol and Immunocytochemistry Characterization

A chemical induction method that was used to differentiate bone marrow derived mesenchymal stem cells into SCs (Xue et al., 2017). Cells incubated for 24 hours in α-Minimum Essential Medium (α-MEM; Gibco) supplemented with 1 µM β-mercaptoethanol (Invitrogen). After 24 hours, the media was replaced by α-MEM supplemented with 35 ng/ml all-trans retinoic acid for 72 hours. Following this, the media was replaced with α-MEM supplemented with 5 ng/ml basic fibroblast growth factor, 126 ng/ml glial cell-derived growth factor (GDNF), and 5.7 µg/ml forskolin. This media was replaced every two days for two weeks. Following this differentiation protocol, cells were plated on laminin coated coverslips and fixed and stained in the same manner as Example 4. Immunofluorescent imaging reveals that the flat fibroblast-like morphology of the OM-MSCs was retained with little to no change in Nestin and Actin Filament expression. Cells maintained expression of S100β, a SC marker, and endoglin (CD105), a mesenchymal stem cell marker (See FIG. 7).

Example 7: OM-MSCs Cultured in Growth Factor Cocktail

Growth factors suspected of contributing to the differentiation of OM-MSCs were added the base media used to culture SCs (DMEM, 10% (v/v) FBS, 50 U/ml Penicillin/Streptomycin, 2 mM of L-glutamine, 10 ug/mL Bovine Pituitary Extract [BPE; Gibco], 6.6 µM Forskolin [Sigma Aldrich]) to make up a Growth Factor Media Cocktail (GF). The media was supplemented with 2.5 ng/ml of Nerve Growth Factor (NGF; Gibco), 3 ng/ml Brain derived Neurotrophic Factor (BDNF; Gibco), 2.1 µg/ml of Glial-cell derived Neurotropic Factor (GDNF; Fisher Scientific). OM-MSCs were plated on laminin coated coverslips in a 12 well plate (See Table 1). Small changes in morphology towards a SC-like morphology were seen at day 7; this change was further evident at days 14 and 21. Following day 14 and 21, cells were fixed and stained in the same manner as Example 4. Immunofluorescent imaging reveals that the flat fibroblast-like morphology of the OM-MSCs shifted towards the elongated bipolar SC appearance. Fluorescent imaging reveals an increase in neuroepithelial stem cell protein (Nestin) positive cells localized in the dOM-MSCs. Additionally, there is a decrease in Actin Filament expression (stained by Phalloidin) in the cells with SC-like morphology. Cells maintained expression of S100β, a SC marker (See FIG. 8).

Example 8: Quantification of Nestin and Actin-Filament Expression

Figure 9B:
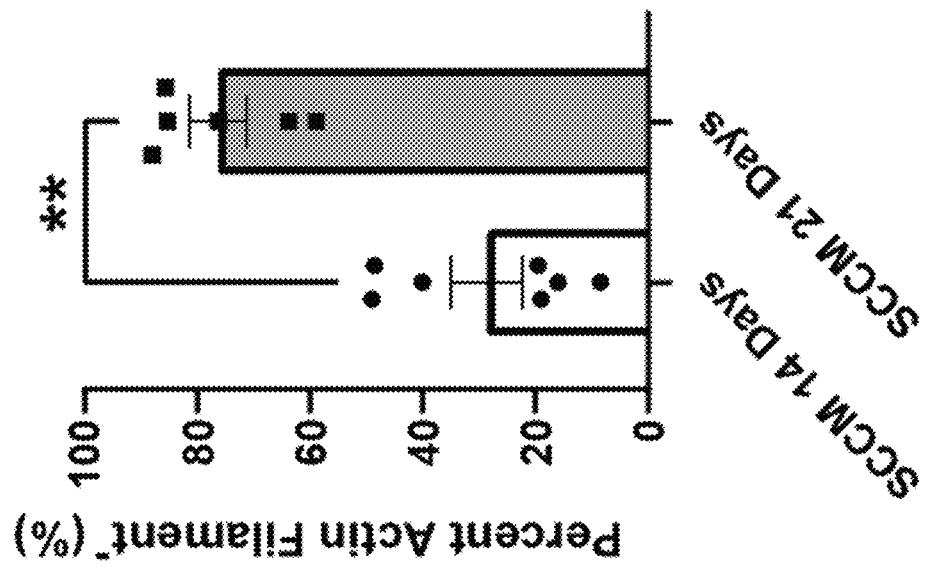
FIGS. 9A-B show quantification of Nestin$^+$ and Actin Filament$^-$ cells from immunofluorescent imaging. The number of cells with strong Nestin and/or actin filament expression was divided by the total number of cells in the image (quantified by counting the number of cell nuclei) resulting in a percentage. Quantification was performed on the Schwann cell conditioned media (SCCM) differentiated Olfactory Mucosa derived mesenchymal stem cells (dOM-MSCs) at day 14 and day 21 as well as the chemical induction protocol (ChI, 19 days) FIG. 9A. shows quantification of Nestin$^+$ cells. The SCCM dOM-MSCs expressed significantly more Nestin compared to SCCM at 14 days and the ChI protocol.
Figure 9A:
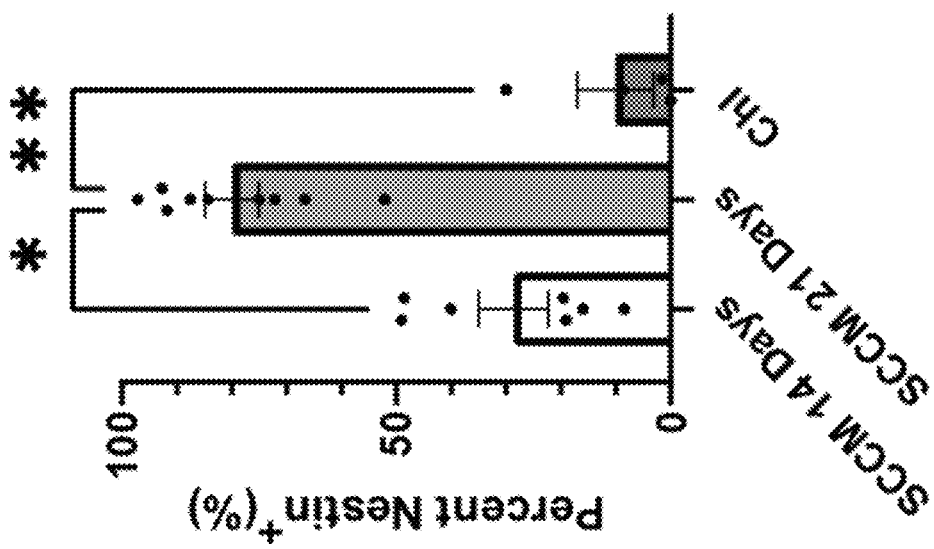

The percentage of Nestin positive (Nestin⁺) cells and actin-filament negative (Actin F⁻), or differentiated Olfactory Mucosa Derived Mesenchymal Stem Cells (dOM-MSCs) was quantified for cells treated with SCCM for 14 days, SCCM for 21 days, and the Chemical Induction (detailed in Example 6). The number of Nestin⁺ and Actin F⁻ cells was counted and divided by the total number of cells (determined by counting the cell nuclei, stained with DAPI) and multiplying by 100. After 21 days of culture in SCCM, 80% of OM-MSCs cells were Nestin$^+$. This is significantly higher than 14 days of culture in SCCM (28.7%) as well as the Chemical Induction protocol (10.1%) (See FIG. 9A). After 14 days of culture in SCCM, 28.7% of OM-MSCs were Actin F$^-$, while at 21 days 76.3% of cells had reduced actin filament expression (See FIG. 9B). These results highlight the importance of a 21-day differentiation process as well as the clear advantage over the previously reported chemical induction method used to differentiate Bone Marrow-derived mesenchymal stem cells.

Example 9: Gene Expression Evaluation

Gene expression was evaluated using polymerase chain reaction (PCR), comparing mRNA extracted from Schwann Cells (SC), Olfactory Mucosa Derived Mesenchymal Stem Cells (OM-MSCs), differentiated OM-MSCs (SCCM Day 21 and GF Day 21), Dorsal Root Ganglia (DRG; neuronal explants), and astrocytes (Central Nervous System Glial). 12 genes of interest were evaluated, S100 calcium-binding protein B (S100β; glial cell marker), SRY-box transcription factor 10 (SOX10; glial cell marker), CD44 (mesenchymal stem cell marker), CD90 (mesenchymal stem cell marker), Endoglin (CD105; mesenchymal stem cell marker), microtubule-associated Protein 2 (MAP2; neural marker), Tubb3 (TUBB3; neural marker), p75 neurotrophin receptor (p75NTR; neurotrophin receptor), Nerve Growth Factor (NGF; neurotrophic factor), Brain-derived neurotrophic factor (BDNF; neurotrophic factor), Glial cell-derived neurotrophic factor (GDNF; neurotrophic factor), vascular endothelial growth factor (VEGF; growth factor). Gene expression was normalized to two reference genes, hypoxanthine phosphoribosyl transferase (HPRT1) and Ornithine decarboxylase antizyme (OAZ1) using the ΔΔCq method on BIO-RAD® CFX Maestro™ Software for PCR data collection and analysis. Prior to gene expression quantification, all primer amplification efficiencies were assessed with standard dilutions. Amplicon size was compared to the expected product size with gel electrophoresis. It is thought that dOM-MSCs will more closely mimic the gene expression of SCs compared to OM-MSCs, DRGs, and astrocytes.

Example 10: Changes in Neurite Outgrowth with Support Cells

Dorsal Root Ganglia were isolated from postnatal (p2) Sprague Dawley Rats via previously reported methods (Puzan, Legesse, Koppes, Fenniri, & Koppes, 2018; Seggio, Ellison, Hynd, Shain, & Thompson, 2008). Whole spines were removed and trimmed of connective tissue. Spines were split medially with scissors and the spinal cord was removed. DRG explants were lifted from the spinal column with forceps and trimmed of excessive connective tissue with a 15-blade scalpel. DRG were stored in Hibernate-A Medium (Gibco) at 4° C. overnight. Explants were dissociated in 1 mg/ml collagenase (Gibco) and 0.1% (v/v) Trypsin (Gibco) for 50 minutes and pelleted. After the supernatant was removed, the explants were further digested with 0.25% (v/v) Trypsin solution for 10 minutes. After centrifugation (700 G) for five minutes, the supernatant was again removed, and the explants were triturated in Neurobasal Media-A (Gibco) to mechanically breakup the digested tissue. The dissociated cells were plated on laminin coated coverslips in 24 well plates at a density of 20,000 cells per well. After three hours, the cell media was removed from the well and replated. This allows for the separation of native SCs and the neuronal cells due to differences in adhesion speed of the different cell types. Support cells were added to the three experimental groups, SCs, OM-MSCs, and SCs+OM-MSCs, at a density of 50,000 cells per well. A control group was maintained with no added support cells. The groups were cultured in Neurobasal-A media, supplemented with 2 mM L-glutamine (Gibco), 50 U/ml (v/v) Penicillin/Streptomycin (Sigma Aldrich), 50× B-27 (Gibco), and 25 ng/mL 2.5 S nerve growth factor (NGF, Gibco), in standard culture conditions (37° C., 5% $CO_2$). After five days, the experimental groups and controls were fixed and strained in the methods mentioned above. Primary antibodies used were chicken anti-neurofilament (Abcam:Ab4580) (1:10000 dilution), and rabbit anti-S100β (Invitrogen). Secondary antibodies used were Alexa Fluor™ 647 goat anti-chicken (Invitrogen:A32933) (1:1000 dilution), Alexa Fluor™ 546 goat anti-rabbit (1:1000 dilution), Alexa Fluor™ 488 Phalloidin (Invitrogen:A12379)

Figure 10B:
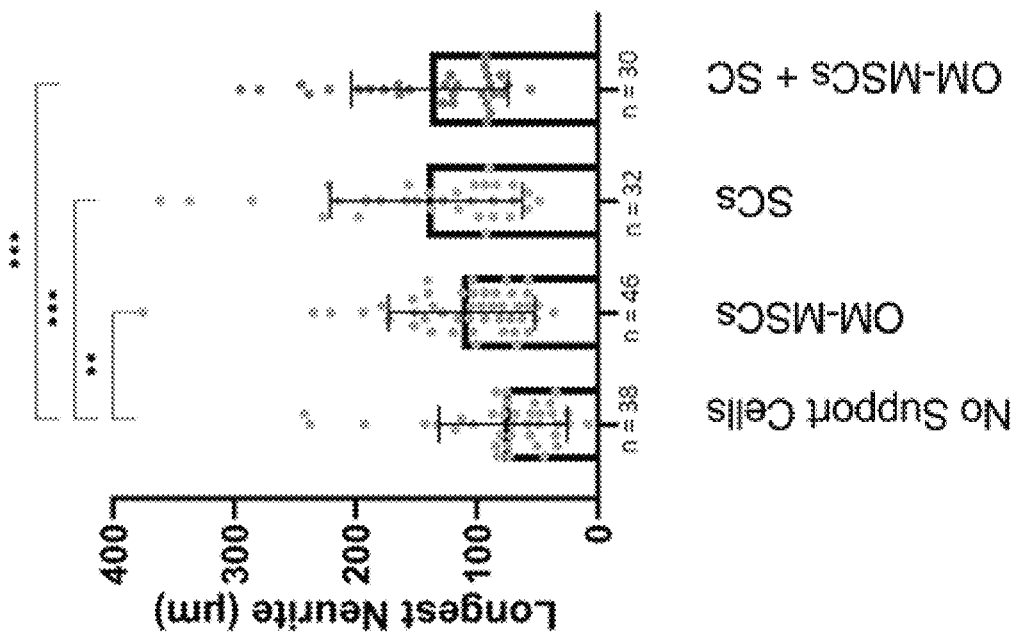
FIGS. 10A-B show quantification of the neurite outgrowth of dissociated Dorsal Root Ganglia (DRG, neurons) with the addition of support cells.
Figure 10A:
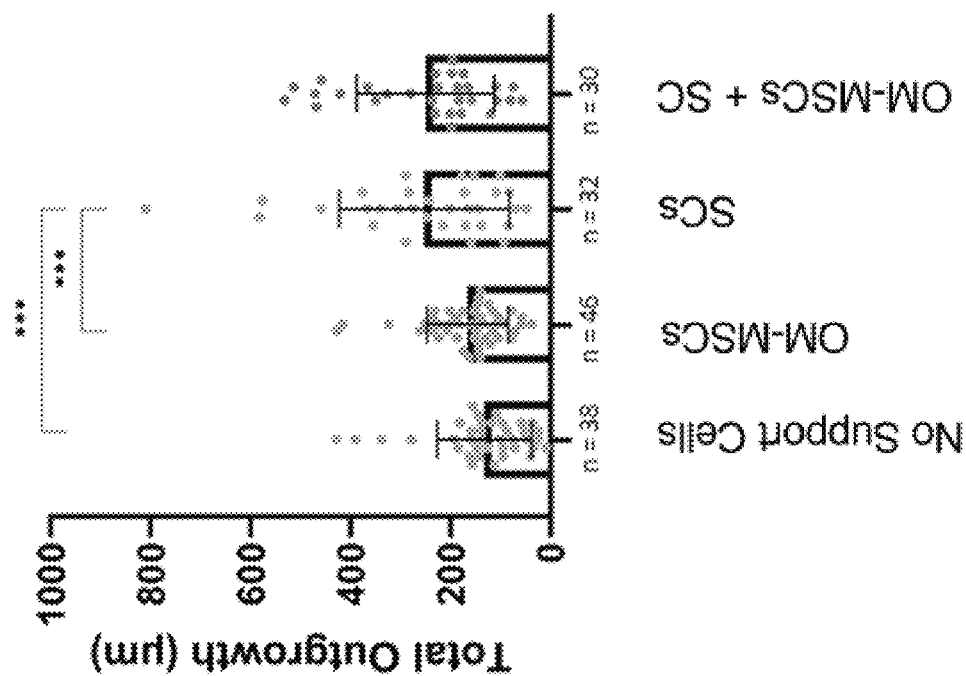

Image analysis was performed with ImageJ, measuring the total length of neurite outgrowth and longest neurite (See FIG. 10A-B). Significant differences in total outgrowth were seen in the SC support cell group relative to the control with no support cells (See FIG. 10A). This demonstrates the benefits of culturing neurons with support cells. Additionally, all three experimental groups had a significant change in the measured longest neurite (See FIG. 10B). This again points to the benefit of support cells in accelerating neuronal growth.

Example 11: Hydrogel Design as a Mode of Cell Delivery

To evaluate a gelatin methacryloyl (GelMA) based hydrogel as a potential mode of cell delivery, dOM-MSCs will be encapsulated in 10% GelMA hydrogels and 7.5% GelMA+ 2.5% Choline Acrylate (ChoA, Biocompatible Ionic Liquid) hydrogels (conductive hydrogel). Previous material properties of 10% GelMA and 7.5% GelMA+2.5% ChoA are reported in Neuman et al., 2022 (Neuman, Kenny, Shi, Koppes, & Koppes, 2022). Prior to encapsulation, dOM-MSCs will be differentiated with the growth factor method that mimics the Schwann cell conditioned media (SCCM) for 21 days. The cells will be encapsulated at a density of 10,000 cells per μl. Viability of the cells will be assessed with a viability and metabolic assays via the manufacturers' protocols (LIVE/DEAD™ Viability/Cytotoxicity Kit, for mammalian cells [ThermoFisher: L3224] and AlamarBlue™ High Sensitivity Cell Viability Reagent [ThermoFisher: A50100]). The cells will be cultured for seven days in DMEM/F-12 supplemented with 10% (v/v) Fetal Bovine Serum (FBS; Coring) and 50 U/ml Penicillin/Streptomycin (Sigma Aldrich) at standard culture conditions. After seven days, viability and metabolic activity will be assessed. The morphology will be assessed through immunocytochemistry in the same manner as described in Example 4. mRNA will also be collected to assess phenotypical changes using RT-PCR and compared to that of SCs in the same method as detailed in Example 8. A hypothesis is that the three-dimensional environment will have acceptable cell viability and metabolic activity with the ability to maintain the differentiated phenotype of the dOM-MSCs, making these hydrogels a feasible option for cell delivery in patients.

Example 12: Electrical Stimulation

Electrical stimulation (ES) has been reported across the literature to increase nerve regeneration and growth especially when cultured on a conductive substrate (Laleh Ghasemi-Mobarakeh, 2009; Schmidt, Shastri, Vacanti, & Langer, 1997; Xu et al., 2014). Additionally, it has been reported that glial cells respond to ES through increases production of neurotrophic factors such as brain derived neurotrophic factor (BDNF) and nerve growth factor (NGF) (Hardy et al., 2015; Koppes et al., 2014). Olfactory Mucosa derived Mesenchymal Stem Cells (OM-MSCs) will be differentiated with the growth factor method that mimics the Schwann cell conditioned media (SCCM) for 21 days. Then, the differentiated OM-MSCs (dOM-MSCs) will be encapsulated in 10% gelatin methacryloyl (GelMA) and 7.5% GelMA+2.5% Choline Acylate (ChoA) hydrogels (conductive hydrogel) at a density of 10,000 cells per µl. Using two platinum electrodes, an alternating current (ax) electrical field of ±100 mV/cm with a frequency of 20 Hz will be applied to experimental groups for 1 hour for three consecutive days. The cells will be cultured for seven days in DMEM/F-12 supplemented with 10% (v/v) Fetal Bovine Serum (FBS; Coring) and 50 U/ml Penicillin/Streptomycin (Sigma Aldrich) at standard culture conditions. After seven days, viability and metabolic activity will be assessed. The morphology will be assessed through immunocytochemistry in the same manner as described in Example 4. mRNA will also be collected to assess phenotypical changes using RT-PCR and compared to that of SCs in the same method as detailed in Example 8. Here, the production of neurotrophic factors of dOM-MSCs is thought to increase because of the ES and conductive hydrogel, further validating the potential of these cells to be used to increase nerve regeneration in patients.

Example 13: Prophetic Application

Accordingly, in certain aspects, differentiated Olfactory Mucosa derived Mesenchymal Stem Cells (OM-MSCs) may be expanded and manipulated towards Schwann cell phenotype for the treatment of peripheral nerve injury or disease. Retrieval of OM-MSCs is minimally invasive and may be carried out during an initial required surgery or additional ambulatory procedure. The resultant Schwann cells can then be incorporated into commercially available synthetic nerve conduits, wraps, or decellularized cadaveric grafts for on-demand use in the operating room. Patient derived populations will not elicit foreign body response.

REFERENCES

Bernal, A., & Arranz, L. (2018). Nestin-expressing progenitor cells: function, identity and therapeutic implications. *Cellular and molecular life sciences: CMLS*, 75(12), 2177-2195. doi:10.1007/s00018-018-2794-z Hardy, J. G., Cornelison, R. C., Sukhavasi, R. C., Saballos, R. J., Vu, P., Kaplan, D. L., & Schmidt, C. E. (2015). Electroactive Tissue Scaffolds with Aligned Pores as Instructive Platforms for Biomimetic Tissue Engineering. *Bioengineering*, 2(1), 15-34. Retrieved from www-mdpi-com/2306-5354/2/1/15

Koppes, A. N., Nordberg, A. L., Paolillo, G. M., Goodsell, N. M., Darwish, H. A., Zhang, L., & Thompson, D. M. (2014). Electrical Stimulation of Schwann Cells Promotes Sustained Increases in Neurite Outgrowth. *Tissue Engineering Part A*, 20(3-4), 494-506. doi:10.1089/ten.tea.2013.0012

Laleh Ghasemi-Mobarakeh, M. P. P., Mohammad Morshed, Mohammad Hossein Nasr-Esfahani, and Seeram Ramakrishna. (2009). Electrical Stimulation of Nerve Cells Using Conductive Nanofibrous Scaffolds for Nerve Tissue Engineering. *Tissue Engineering Part A*, 15(11), 3605-3619. doi:10.1089/ten.tea.2008.0689

Morrissey, T. K., Kleitman, N., & Bunge, R. P. (1991). Isolation and functional characterization of Schwann cells derived from adult peripheral nerve. *Journal of Neuroscience*, 11(8), 2433-2442.

Neuman, K. E., Kenny, A., Shi, L., Koppes, A., & Koppes, R. (2022). Complex Material Properties of Gel-Amin: A Transparent and Ionically Conductive Hydrogel for Neural Tissue Engineering. *Cells Tissues Organs*.

Puzan, M. L., Legesse, B., Koppes, R. A., Fenniri, H., & Koppes, A. N. (2018). Bioactive Organic Rosette Nanotubes Support Sensory Neurite Outgrowth. *ACS Biomaterials Science & Engineering*, 4(5), 1630-1640. doi:10.1021/acsbiomaterials.8b00326

Schmidt, C. E., Shastri, V. R., Vacanti, J. P., & Langer, R. (1997). Stimulation of neurite outgrowth using an electrically conducting polymer. *Proceedings of the National Academy of Sciences*, 94(17), 8948-8953. doi:10.1073/pnas.94.17.8948

Seggio, A. M., Ellison, K. S., Hynd, M. R., Shain, W., & Thompson, D. M. (2008). Cryopreservation of transfected primary dorsal root ganglia neurons. *Journal of Neuroscience Methods*, 173(1), 67-73. doi: doi-org/10.1016/j.jneumeth.2008.05.017

Xu, H., Holzwarth, J. M., Yan, Y., Xu, P., Zheng, H., Yin, Y., . . . . Ma, P. X. (2014). Conductive PPY/PDLLA conduit for peripheral nerve regeneration. *Biomaterials*, 35(1), 225-235. doi: doi-org/10.1016/j.biomaterials.2013.10.002

While example embodiments have been particularly shown and described, it will be understood by those skilled in the art that various changes in form and details may be made therein without departing from the scope of the embodiments contemplated herein.

What is claimed is:

1. A method of promoting neurite outgrowth in a neuron, the method comprising:
   a) propagating olfactory mucosa-derived mesenchymal stem cells (OM-MSCs) in Schwann cell conditioned media (SCCM) for about 14-21 days, thereby producing differentiated olfactory mucosa-derived mesenchymal stem cells (dOM-MSCs);
   b) isolating the dOM-MSCs, thereby producing isolated dOM-MSCs; and
   c) contacting the neuron with a composition comprising the isolated dOM-MSCs, thereby promoting neurite outgrowth in the neuron.

2. The method of claim 1, wherein the SCCM comprises:
   a) Dulbecco's Modified Eagle Medium (DMEM);
   b) about 10% v/v fetal bovine serum (FBS);
   c) about 50 U/mL antibiotic, wherein the antibiotic is penicillin or streptomycin, or a combination thereof;
   d) about 2 mM of L-glutamine;
   e) about 0.01-10 µg/mL bovine pituitary extract (BPE); and
   f) about 0.06-6.6 µM Forskolin.

3. The method of claim 2, wherein the SCCM further comprises at least one growth factor selected from Nerve Growth Factor (NGF), Brain Derived Neurotropic Factor (BDNF), Glial-cell Derived Neurotropic Factor (GDNF), or a combination thereof.

4. The method of claim 3, wherein a concentration of at least one growth factor is:
   a) about 0.0025-2.5 ng/mL Nerve Growth Factor (NGF);
   b) about 0.003-3 ng/mL Brain Derived Neurotropic Factor (BDNF); and/or c) about 0.0021-2.1 μg/mL Glial-cell Derived Neurotropic Factor (GDNF).

5. The method of claim 1, wherein the composition comprising the isolated dOM-MSCs further comprises a nerve guide conduit.

6. The method of claim 1, wherein the neuron is a damaged neuron, and promoting neurite outgrowth in the neuron repairs the damaged neuron.

7. The method of claim 1, wherein the neuron is in a human subject.

8. The method of claim 1, wherein the OM-MSCs are from a human subject.

9. The method of claim 1, wherein the dOM-MSCs have increased neuroepithelial stem cell protein (Nestin) expression compared to OM-MSCs or OM-MSCs differentiated by chemical induction.

10. The method of claim 1, wherein the dOM-MSCs have decreased actin filament expression compared to OM-MSCs or OM-MSCs differentiated by chemical induction.

* * * * *